US012482436B2

(12) United States Patent
Howard et al.

(10) Patent No.: US 12,482,436 B2
(45) Date of Patent: Nov. 25, 2025

(54) TECHNOLOGIES FOR SELECTIVE FRAME UPDATE ON A DISPLAY

(71) Applicant: Intel Corporation, Santa Clara, CA (US)

(72) Inventors: John S. Howard, Portland, OR (US); Vishal Ravindra Sinha, Portland, OR (US); Douglas R. Huard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 796 days.

(21) Appl. No.: 17/555,566

(22) Filed: Dec. 20, 2021

(65) Prior Publication Data

US 2022/0114985 A1 Apr. 14, 2022

(51) Int. Cl.
*G09G 5/00* (2006.01)

(52) U.S. Cl.
CPC ....... *G09G 5/006* (2013.01); *G09G 2360/127* (2013.01); *G09G 2360/18* (2013.01); *G09G 2370/04* (2013.01)

(58) Field of Classification Search
CPC ................. G09G 5/006; G09G 3/2092; G09G 2360/127; G09G 2360/18; G09G 2360/08; G09G 2370/04; G09G 2370/08; G09G 2310/08
See application file for complete search history.

(56) References Cited

U.S. PATENT DOCUMENTS

| | | | | |
|---|---|---|---|---|
| 2011/0157201 | A1* | 6/2011 | Hedges | G06F 3/14 345/545 |
| 2015/0208021 | A1* | 7/2015 | Cho | H04N 9/8205 386/230 |
| 2018/0286317 | A1* | 10/2018 | Park | G09G 3/342 |
| 2019/0041955 | A1 | 2/2019 | Kwa et al. | |
| 2019/0043458 | A1 | 2/2019 | Kwa et al. | |
| 2019/0369703 | A1 | 12/2019 | Tan et al. | |
| 2021/0064191 | A1* | 3/2021 | Liao | G06F 3/1454 |

OTHER PUBLICATIONS

Wiley, Craig, DisplayPort Technical Overview: IEEE International Conference on Consumer Electronics (ICCE) Advances & Challenges in HD Interconnects; Jan. 10, 2011; Las Vegas; 40 pages.
"Display Stream Compression (DSC) Standard;" VESA Video Electronics Standards Association; Version 1.2b; Aug. 12, 2021; 156 pages.

(Continued)

*Primary Examiner* — Brent D Castiaux
(74) *Attorney, Agent, or Firm* — Alliance IP, LLC

(57) ABSTRACT

Techniques for selectively updating regions of a display are disclosed. In the illustrative embodiment, a display engine of a computing device sends messages to a display to update particular update regions of the display. As not the entire frame is sent, sending only the update regions can save bandwidth and power. In the illustrative embodiment, some of the update regions for a frame sent to the display may be compressed and some of the update regions for the frame may be uncompressed. Due to overhead in the compression, sending small update regions uncompressed may reduce the bandwidth and/or power used.

25 Claims, 15 Drawing Sheets

(56) References Cited

OTHER PUBLICATIONS

Wiley, Craig, “eDP Embedded DisplayPort the New Generation Digital Display Interface for Embedded Applications;” DisplayPort Developer Conference; Dec. 6, 2010; Westin Taipei; 30 pages.
Howard, John S. et al., “Technologies for Selective Frame Update on a Display;” U.S. Appl. No. 17/555,566, filed Dec. 20, 2021; 70 pages.
USPTO Office Action received in U.S. Appl. No. 17/561,323, dated Apr. 3, 2025, 25 pages.

* cited by examiner

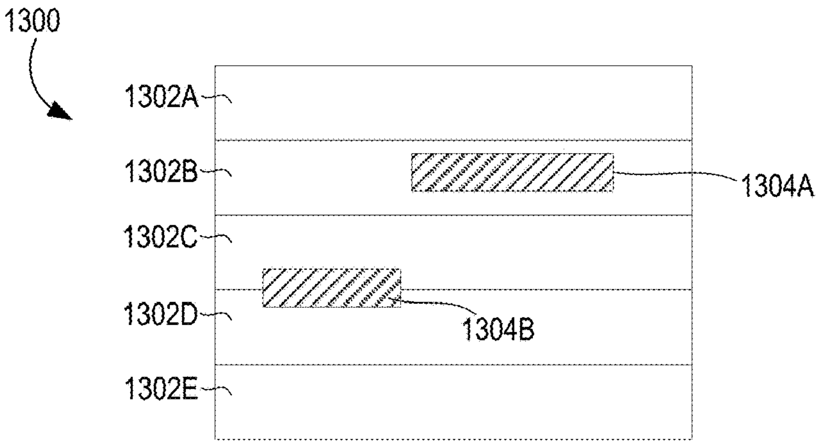

FIG. 13

1400

UPDATE_NOTI FORMAT

<table>
<tr><td></td><td colspan="8">BYTE 3</td><td colspan="8">BYTE 2</td><td colspan="8">BYTE 1</td><td colspan="8">BYTE 0</td></tr>
<tr><td>DWORD</td><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>14</td><td>13</td><td>14</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>0</td><td colspan="16">MESSAGE LENGTH WORD 0</td><td colspan="4">RSVD</td><td>U</td><td>L</td><td>M</td><td>R</td><td colspan="3">RSVD</td><td colspan="2">DSC</td><td>S</td><td>I</td><td>F</td></tr>
<tr><td>1</td><td colspan="16">SEL. UPDATE START X COORD.</td><td colspan="16">MESSAGE LENGTH WORD 1</td></tr>
<tr><td>2</td><td colspan="16">SEL. UPDATE STOP X COORD.</td><td colspan="16">SEL. UPDATE START Y COORD.</td></tr>
<tr><td>3</td><td colspan="16"></td><td colspan="16">SEL. UPDATE STOP Y COORD.</td></tr>
</table>

FIG. 14A

1402

DSC FIELD ENCODING

| ENCODING | DESCRIPTION |
|---|---|
| 00b | UNDEFINED/NOT USED |
| 01b | 1:1 COMPRESSION RATIO |
| 10b | 2:1 COMPRESSION RATIO |
| 11b | 3:1 COMPRESSION RATIO |

FIG. 14B

TECHNOLOGIES FOR SELECTIVE FRAME UPDATE ON A DISPLAY

BACKGROUND

High-resolution displays with a high refresh rate require enormous bandwidth to fully refresh a frame with the next full, uncompressed frame. In order to reduce bandwidth and power requirements, in some cases, a video source and display can enter a compressed mode, in which frames sent to the display are compressed, reducing bandwidth and power requirements. In some cases, a display can be partially updated. For example, an update of a subset of lines of the previous frame may be provided to a display, further reducing the power and bandwidth requirements when the image to be displayed only changes slightly.

BRIEF DESCRIPTION OF THE DRAWINGS

FIG. 13 is a simplified diagram showing possible update regions of a frame.

FIG. 14A is a table showing a format of a message that may be sent by the computing device of FIG. 1.

FIG. 14B is a table showing one embodiment of an encoding of a field of the message of FIG. 14A.

DETAILED DESCRIPTION

Figure 1A:
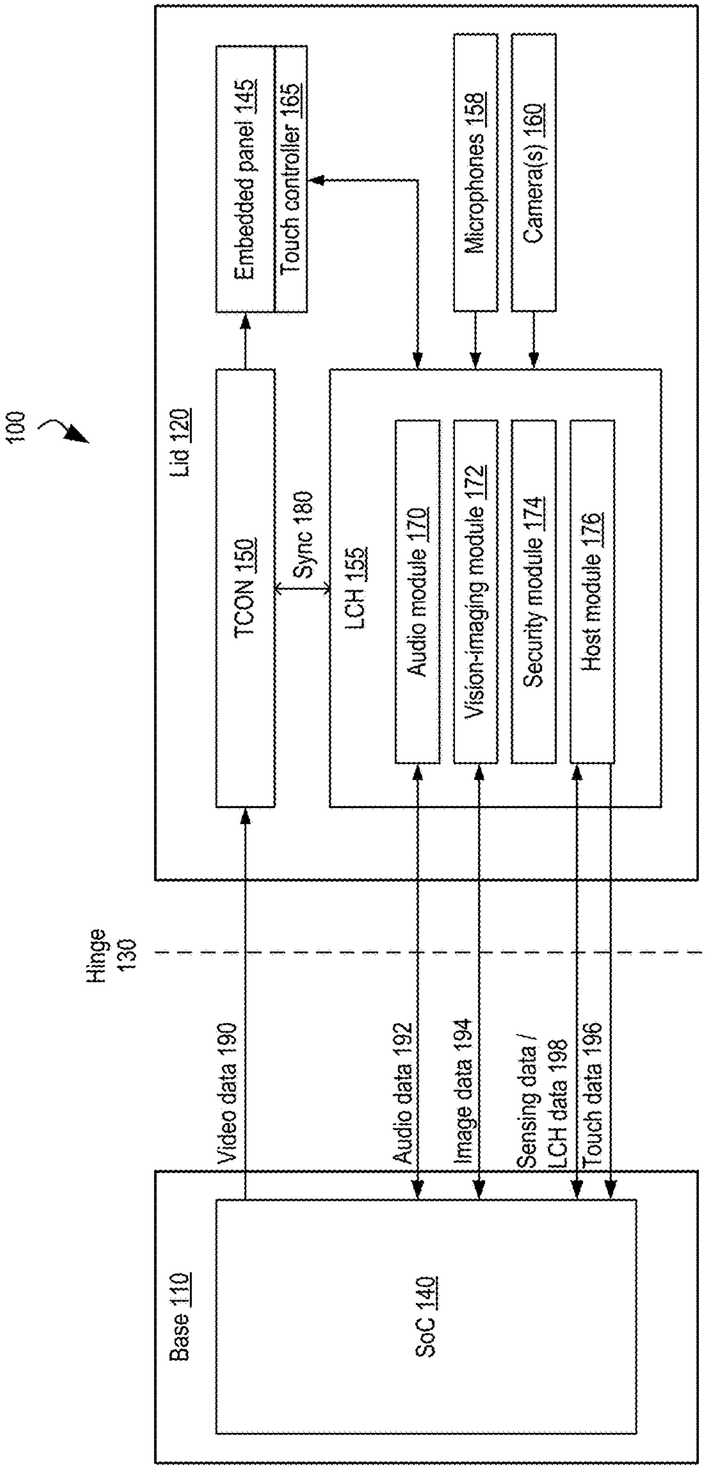
FIG. 1A is a block diagram of a first example computing device comprising a lid controller hub.

Lid controller hubs are disclosed herein that perform a variety of computing tasks in the lid of a laptop or computing devices with a similar form factor. A lid controller hub can process sensor data generated by microphones, a touchscreen, cameras, and other sensors located in a lid. A lid controller hub allows for laptops with improved and expanded user experiences, increased privacy and security, lower power consumption, and improved industrial design over existing devices. For example, a lid controller hub allows the sampling and processing of touch sensor data to be synchronized with a display's refresh rate, which can result in a smooth and responsive touch experience across. The continual monitoring and processing of image and audio sensor data captured by cameras and microphones located in the lid allow a laptop to wake when an authorized user's voice and face is detected. The lid controller hub provides enhanced safety by operating in a trusted execution environment. Only properly authenticated firmware is allowed to operate in the lid controller hub, meaning that no unwanted applications can access lid-based microphones and cameras.

Enhanced and improved experiences are enabled by the lid controller hub's computing resources. For example, neural network accelerators within the lid controller hub can blur displays or faces in the background of a video call or filter out the sound of a dog barking in the background of an audio call. Power savings are realized through the use of various techniques such as enabling sensors when they are likely to be in use, such as sampling touch input at a display at a typical sampling rates when touch interaction is detected. Processing sensor data locally in the lid instead of having to send it across the hinge and then have it processed by the operating system, provides for latency improvements and saves power. Lid controller hub also allows for laptop designs in which fewer wires are carried across a hinge. Not only can this reduce hinge cost, it can result in a simpler and thus more aesthetically pleasing industrial design. These and other lid controller hub features and advantages are discussed in greater detail below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1A illustrates a block diagram of a first example mobile computing device comprising a lid controller hub. The computing device 100 comprises a base 110 connected to a lid 120 by a hinge 130. The mobile computing device (also referred to herein as "user device") 100 can be a laptop or a mobile computing device with a similar form factor. The base 110 comprises a host system-on-a-chip (SoC) 140 that comprises one or more processor units integrated with one or more additional components, such as a memory controller, graphics processing unit (GPU), caches, an image processing module, and other components described herein. The base 110 can further comprise a physical keyboard, touchpad, battery, memory, storage, and external ports. The lid 120 comprises an embedded display panel 145, a timing controller (TCON) 150, a lid controller hub (LCH) 155, microphones 158, one or more cameras 160, and a touch controller 165. TCON 150 converts video data 190 received from the SoC 140 into signals that drive the display panel 145.

The display panel 145 can be any type of embedded display in which the display elements responsible for generating light or allowing the transmission of light are located in each pixel. Such displays may include TFT LCD (thin-film-transistor liquid crystal display), micro-LED (micro-light-emitting diode (LED)), OLED (organic LED), and QLED (quantum dot LED) displays. A touch controller 165 drives the touchscreen technology utilized in the display panel 145 and collects touch sensor data provided by the employed touchscreen technology. The display panel 145 can comprise a touchscreen comprising one or more dedicated layers for implementing touch capabilities or 'in-cell' or 'on-cell' touchscreen technologies that do not require dedicated touchscreen layers.

The microphones 158 can comprise microphones located in the bezel of the lid or in-display microphones located in the display area, the region of the panel that displays content. The one or more cameras 160 can similarly comprise cameras located in the bezel or in-display cameras located in the display area.

LCH 155 comprises an audio module 170, a vision/imaging module 172, a security module 174, and a host module 176. The audio module 170, the vision/imaging module 172 and the host module 176 interact with lid sensors process the sensor data generated by the sensors. The audio module 170 interacts with the microphones 158 and processes audio sensor data generated by the microphones 158, the vision/imaging module 172 interacts with the one or more cameras 160 and processes image sensor data generated by the one or more cameras 160, and the host module 176 interacts with the touch controller 165 and processes touch sensor data generated by the touch controller 165. A synchronization signal 180 is shared between the timing controller 150 and the lid controller hub 155. The synchronization signal 180 can be used to synchronize the sampling of touch sensor data and the delivery of touch sensor data to the SoC 140 with the refresh rate of the display panel 145 to allow for a smooth and responsive touch experience at the system level.

As used herein, the phrase "sensor data" can refer to sensor data generated or provided by sensor as well as sensor data that has undergone subsequent processing. For example, image sensor data can refer to sensor data received at a frame router in a vision/imaging module as well as processed sensor data output by a frame router processing stack in a vision/imaging module. The phrase "sensor data" can also refer to discrete sensor data (e.g., one or more images captured by a camera) or a stream of sensor data (e.g., a video stream generated by a camera, an audio stream generated by a microphone). The phrase "sensor data" can further refer to metadata generated from the sensor data, such as a gesture determined from touch sensor data or a head orientation or facial landmark information generated from image sensor data.

The audio module 170 processes audio sensor data generated by the microphones 158 and in some embodiments enables features such as Wake on Voice (causing the device 100 to exit from a low-power state when a voice is detected in audio sensor data), Speaker ID (causing the device 100 to exit from a low-power state when an authenticated user's voice is detected in audio sensor data), acoustic context awareness (e.g., filtering undesirable background noises), speech and voice pre-processing to condition audio sensor data for further processing by neural network accelerators, dynamic noise reduction, and audio-based adaptive thermal solutions.

The vision/imaging module 172 processes image sensor data generated by the one or more cameras 160 and in various embodiments can enable features such as Wake on Face (causing the device 100 to exit from a low-power state when a face is detected in image sensor data) and Face ID (causing the device 100 to exit from a low-power state when an authenticated user's face is detected in image sensor data). In some embodiments, the vision/imaging module 172 can enable one or more of the following features: head orientation detection, determining the location of facial landmarks (e.g., eyes, mouth, nose, eyebrows, cheek) in an image, and multi-face detection.

The host module 176 processes touch sensor data provided by the touch controller 165. The host module 176 is able to synchronize touch-related actions with the refresh rate of the embedded panel 145. This allows for the synchronization of touch and display activities at the system level, which provides for an improved touch experience for any application operating on the mobile computing device.

Thus, the LCH 155 can be considered to be a companion die to the SoC 140 in that the LCH 155 handles some sensor data-related processing tasks that are performed by SoCs in existing mobile computing devices. The proximity of the LCH 155 to the lid sensors allows for experiences and capabilities that may not be possible if sensor data has to be sent across the hinge 130 for processing by the SoC 140. The proximity of LCH 155 to the lid sensors reduces latency, which creates more time for sensor data processing. For example, as will be discussed in greater detail below, the LCH 155 comprises neural network accelerators, digital signals processors, and image and audio sensor data processing modules to enable features such as Wake on Voice, Wake on Face, and contextual understanding. Locating LCH computing resources in proximity to lid sensors also allows for power savings as lid sensor data needs to travel a shorter length—to the LCH instead of across the hinge to the base.

Lid controller hubs allow for additional power savings. For example, an LCH allows the SoC and other components in the base to enter into a low-power state while the LCH monitors incoming sensor data to determine whether the device is to transition to an active state. By being able to wake the device only when the presence of an authenticated user is detected (e.g., via Speaker ID or Face ID), the device can be kept in a low-power state longer than if the device were to wake in response to detecting the presence of any person. Lid controller hubs also allow the sampling of touch inputs at an embedded display panel to be reduced to a lower rate (or be disabled) in certain contexts. Additional power savings enabled by a lid controller hub are discussed in greater detail below.

As used herein the term "active state" when referencing a system-level state of a mobile computing device refers to a state in which the device is fully usable. That is, the full capabilities of the host processor unit and the lid controller hub are available, one or more applications can be executing, and the device is able to provide an interactive and responsive user experience—a user can be watching a movie, participating in a video call, surfing the web, operating a computer-aided design tool, or using the device in one of a myriad of other fashions. While the device is in an active state, one or more modules or other components of the device, including the lid controller hub or constituent modules or other components of the lid controller hub, can be placed in a low-power state to conserve power. The host processor units can be temporarily placed in a high-performance mode while the device is in an active state to accommodate demanding workloads. Thus, a mobile computing device can operate within a range of power levels when in an active state.

As used herein, the term "low-power state" when referencing a system-level state of a mobile computing device refers to a state in which the device is operating at a lower power consumption level than when the device is operating in an active state. Typically, the host processing unit is operating at a lower power consumption level than when the device is in an active state and more device modules or other components are collectively operating in a low-power state than when the device is in an active state. A device can operate in one or more low-power states with one difference between the low-power states being characterized by the power consumption level of the device level. In some embodiments, another difference between low-power states is characterized by how long it takes for the device to wake in response to user input (e.g., keyboard, mouse, touch, voice, user presence being detected in image sensor data, a user opening or moving the device), a network event, or input from an attached device (e.g., USB device). Such low-power states can be characterized as "standby", "idle", "sleep" or "hibernation" states.

In a first type of device-level low-power state, such as ones characterized as an "idle" or "standby" low-power state, the device can quickly transition from the low-power state to an active state in response to user input, hardware or network events. In a second type of device-level low-power state, such as one characterized as a "sleep" state, the device consumes less power than in the first type of low-power state and volatile memory is kept refreshed to maintain the device state. In a third type of device-level low-power state, such as one characterized as a "hibernate" low-power state, the device consumes less power than in the second type of low-power state. Non-volatile memory is not kept refreshed and the device state is stored in non-volatile memory. The device takes a longer time to wake from the third type of low-power state than from a first or second type of low-power state due to having to restore the system state from non-volatile memory. In a fourth type of low-power state, the device is off and not consuming power. Waking the device from an off state requires the device to undergo a full reboot. As used herein, waking a device refers to a device transitioning from a low-power state to an active state.

In reference to a lid hub controller, the term "active state", refers to a lid hub controller state in which the full resources of the lid hub controller are available. That is, the LCH can be processing sensor data as it is generated, passing along sensor data and any data generated by the LCH based on the sensor data to the host SoC, and displaying images based on video data received from the host SoC. One or more components of the LCH can individually be placed in a low-power state when the LCH is in an active state. For example, if the LCH detects that an authorized user is not detected in image sensor data, the LCH can cause a lid display to be disabled. In another example, if a privacy mode is enabled, LCH components that transmit sensor data to the host SoC can be disabled. The term "low-power" state, when referring to a lid controller hub can refer to a power state in which the LCH operates at a lower power consumption level than when in an active state, and is typically characterized by one or more LCH modules or other components being placed in a low-power state than when the LCH is in an active state. For example, when the lid of a computing device is closed, a lid display can be disabled, an LCH vision/imaging module can be placed in a low-power state and an LCH audio module can be kept operating to support a Wake on Voice feature to allow the device to continue to respond to audio queries.

A module or any other component of a mobile computing device can be placed in a low-power state in various manners, such as by having its operating voltage reduced, being supplied with a clock signal with a reduced frequency, or being placed into a low-power state through the receipt of control signals that cause the component to consume less power (such as placing a module in an image display pipeline into a low-power state in which it performs image processing on only a portion of an image).

In some embodiments, the power savings enabled by an LCH allow for a mobile computing device to be operated for a day under typical use conditions without having to be recharged. Being able to power a single day's use with a lower amount of power can also allow for a smaller battery to be used in a mobile computing device. By enabling a smaller battery as well as enabling a reduced number of wires across a hinge connecting a device to a lid, laptops comprising an LCH can be thinner and lighter and thus have an improved industrial design over existing devices.

In some embodiments, the lid controller hub technologies disclosed herein allow for laptops with intelligent collaboration and personal assistant capabilities. For example, an LCH can provide near-field and far-field audio capabilities that allow for enhanced audio reception by detecting the location of a remote audio source and improving the detection of audio arriving from the remote audio source location. When combined with Wake on Voice and Speaker ID capabilities, near- and far-field audio capabilities allow for a mobile computing device to behave similarly to the "smart speakers" that are pervasive in the market today. For example, consider a scenario where a user takes a break from working, walks away from their laptop, and asks the laptop from across the room, "What does tomorrow's weather look like?" The laptop, having transitioned into a low-power state due to not detecting the face of an authorized user in image sensor data provided by a user-facing camera, is continually monitoring incoming audio sensor data and detects speech coming from an authorized user. The laptop exits its low-power state, retrieves the requested information, and answers the user's query.

The hinge 130 can be any physical hinge that allows the base 110 and the lid 120 to be rotatably connected. The wires that pass across the hinge 130 comprise wires for passing video data 190 from the SoC 140 to the TCON 150, wires for passing audio data 192 between the SoC 140 and the audio module 170, wires for providing image data 194 from the vision/imaging module 172 to the SoC 140, wires for providing touch data 196 from the LCH 155 to the SoC 140, and wires for providing data determined from image sensor data and other information generated by the LCH 155 from the host module 176 to the SoC 140. In some embodiments, data shown as being passed over different sets of wires between the SoC and LCH are communicated over the same set of wires. For example, in some embodiments, touch data, sensing data, and other information generated by the LCH can be sent over a single USB bus.

In some embodiments, the lid 120 is removably attachable to the base 110. In some embodiments, the hinge can allow the base 110 and the lid 120 to rotate to substantially 360 degrees with respect to either other. In some embodiments, the hinge 130 carries fewer wires to communicatively couple the lid 120 to the base 110 relative to existing computing devices that do not have an LCH. This reduction in wires across the hinge 130 can result in lower device cost, not just due to the reduction in wires, but also due to being a simpler electromagnetic and radio frequency interface (EMI/RFI) solution.

The components illustrated in FIG. 1A as being located in the base of a mobile computing device can be located in a base housing and components illustrated in FIG. 1A as being located in the lid of a mobile computing device can be located in a lid housing.

Figure 1B:
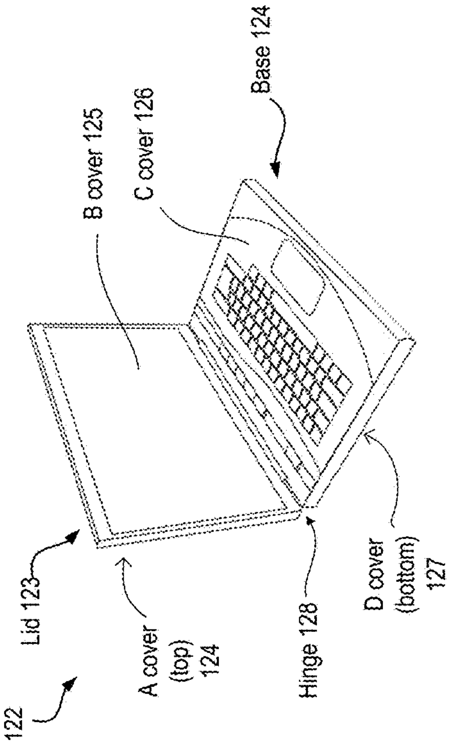
FIG. 1B is a perspective view of a second example mobile computing device in which a lid controller hub can be utilized.

FIG. 1B illustrates a perspective view of a secondary example mobile computing comprising a lid controller hub. The mobile computing device 122 can be a laptop or other mobile computing device with a similar form factor, such as a foldable tablet or smartphone. The lid 123 comprises an "A cover" 124 that is the world-facing surface of the lid 123 when the mobile computing device 122 is in a closed configuration and a "B cover" 125 that comprises a user-facing display when the lid 123 is open. The base 129 comprises a "C cover" 126 that comprises a keyboard that is upward facing when the device 122 is an open configuration and a "D cover" 127 that is the bottom of the base 129. In some embodiments, the base 129 comprises the primary computing resources (e.g., host processor unit(s), GPU) of the device 122, along with a battery, memory, and storage, and communicates with the lid 123 via wires that pass through a hinge 128. Thus, in embodiments where the mobile computing device is a dual-display device, such as a dual display laptop, tablet, or smartphone, the base can be regarded as the device portion comprising host processor units and the lid can be regarded as the device portion comprising an LCH. A Wi-Fi antenna can be located in the base or the lid of any computing device described herein.

In other embodiments, the computing device 122 can be a dual display device with a second display comprising a portion of the C cover 126. For example, in some embodiments, an "always-on" display (AOD) can occupy a region of the C cover below the keyboard that is visible when the lid 123 is closed. In other embodiments, a second display covers most of the surface of the C cover and a removable keyboard can be placed over the second display or the second display can present a virtual keyboard to allow for keyboard input.

Lid controller hubs are not limited to being implemented in laptops and other mobile computing devices having a form factor similar to that illustrated FIG. 1B. The lid controller hub technologies disclosed herein can be employed in mobile computing devices comprising one or more portions beyond a base and a single lid, the additional one or more portions comprising a display and/or one or more sensors. For example, a mobile computing device comprising an LCH can comprise a base; a primary display portion comprising a first touch display, a camera, and microphones; and a secondary display portion comprising a second touch display. A first hinge rotatably couples the base to the secondary display portion and a second hinge rotatably couples the primary display portion to the secondary display portion. An LCH located in either display portion can process sensor data generated by lid sensors located in the same display portion that the LCH is located in or by lid sensors generated in both display portions. In this example, a lid controller hub could be located in either or both of the primary and secondary display portions. For example, a first LCH could be located in the secondary display that communicates to the base via wires that pass through the first hinge and a second LCH could be located in the primary display that communicates to the base via wires passing through the first and second hinge.

Figure 2:
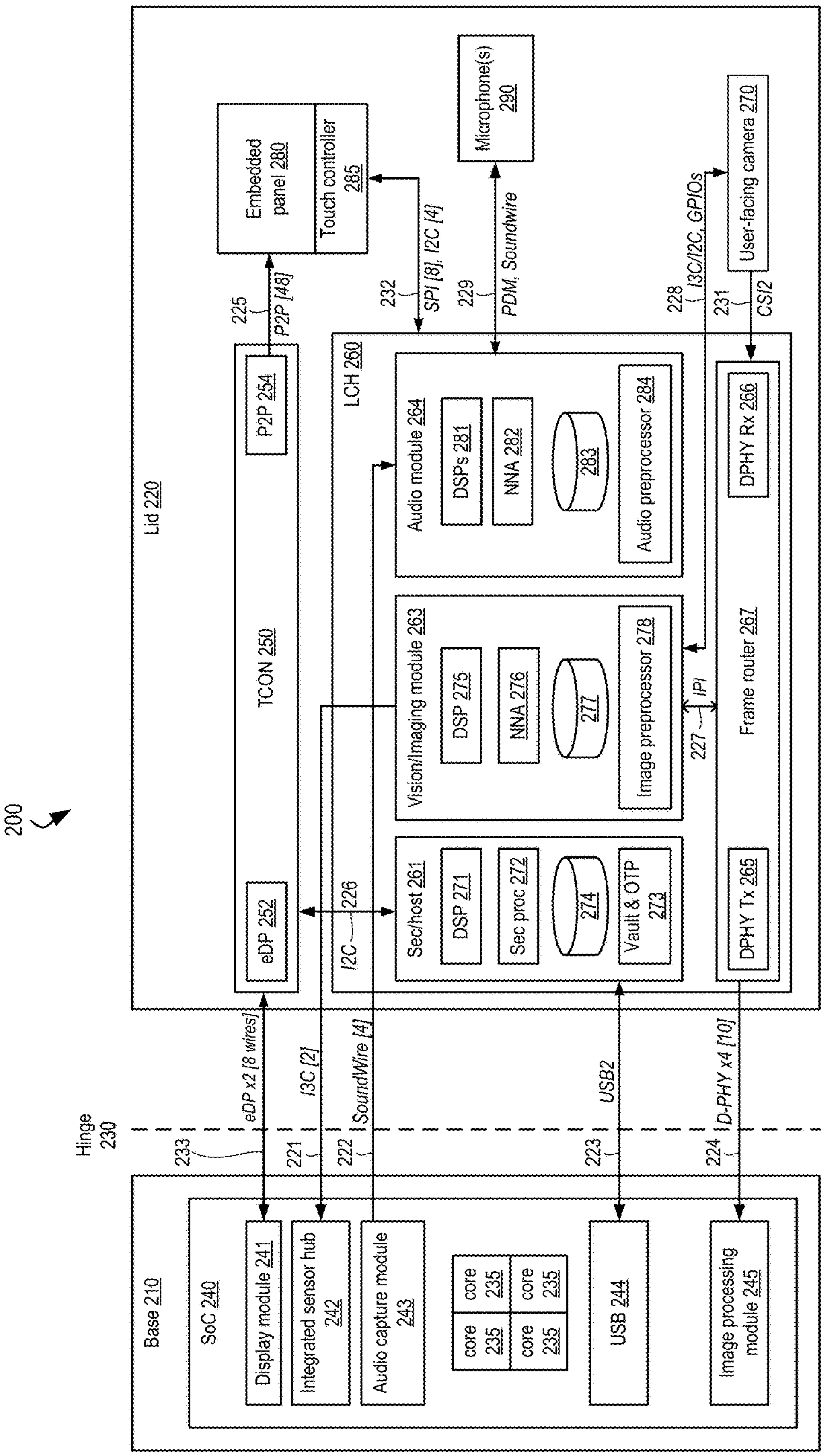
FIG. 2 is a block diagram of a third example mobile computing device comprising a lid controller hub.

FIG. 2 illustrates a block diagram of a third example mobile computing device comprising a lid controller hub. The device 200 comprises a base 210 connected to a lid 220 by a hinge 230. The base 210 comprises an SoC 240. The lid 220 comprises a timing controller (TCON) 250, a lid controller hub (LCH) 260, a user-facing camera 270, an embedded display panel 280, and one or more microphones 290.

The SoC 240 comprises a display module 241, an integrated sensor hub 242, an audio capture module 243, a Universal Serial Bus (USB) module 244, an image processing module 245, and a plurality of processor cores 235. The display module 241 communicates with an embedded DisplayPort (eDP) module in the TCON 250 via an eight-wire eDP connection 233. In some embodiments, the embedded display panel 280 is a "3K2K" display (a display having a 3K×2K resolution) with a refresh rate of up to 120 Hz and the connection 233 comprises two eDP High Bit Rate 2 (HBR2 (17.28 Gb/s)) connections. The integrated sensor hub 242 communicates with a vision/imaging module 263 of the LCH 260 via a two-wire Mobile Industry Processor Interface (MIPI) I3C (SenseWire) connection 221, the audio capture module 243 communicates with an audio module 264 of the LCH 260 via a four-wire MIPI SoundWire® connection 222, the USB module 244 communicates with a security/host module 261 of the LCH 260 via a USB connection 223, and the image processing module 245 receives image data from a MIPI D-PHY transmit port 265 of a frame router 267 of the LCH 260 via a four-lane MIPI D-PHY connection 224 comprising 10 wires. The integrated sensor hub 242 can be an Intel® integrated sensor hub or any other sensor hub capable of processing sensor data from one or more sensors.

The TCON 250 comprises the eDP port 252 and a Peripheral Component Interface Express (PCIe) port 254 that drives the embedded display panel 280 using PCIe's peer-to-peer (P2P) communication feature over a 48-wire connection 225.

The LCH 260 comprises the security/host module 261, the vision/imaging module 263, the audio module 264, and a frame router 267. The security/host module 261 comprises a digital signal processing (DSP) processor 271, a security processor 272, a vault and one-time password generator (OTP) 273, and a memory 274. In some embodiments, the DSP 271 is a Synopsis® DesignWare® ARC® EM7D or EM11D DSP processor and the security processor is a Synopsis® DesignWare® ARC® SEM security processor. In addition to being in communication with the USB module 244 in the SoC 240, the security/host module 261 communicates with the TCON 250 via an inter-integrated circuit (I2C) connection 226 to provide for synchronization between LCH and TCON activities. The memory 274 stores instructions executed by components of the LCH 260.

The vision/imaging module 263 comprises a DSP 275, a neural network accelerator (NNA) 276, an image preprocessor 278, and a memory 277. In some embodiments, the DSP 275 is a DesignWare® ARC® EM11D processor. The vision/imaging module 263 communicates with the frame router 267 via an intelligent peripheral interface (IPI) connection 227. The vision/imaging module 263 can perform face detection, detect head orientation, and enables device access based on detecting a person's face (Wake on Face) or an authorized user's face (Face ID) in image sensor data. In some embodiments, the vision/imaging module 263 can implement one or more artificial intelligence (AI) models via the neural network accelerators 276 to enable these functions. For example, the neural network accelerator 276 can implement a model trained to recognize an authorized user's face in image sensor data to enable a Wake on Face feature. The vision/imaging module 263 communicates with the camera 270 via a connection 228 comprising a pair of I2C or I3C wires and a five-wire general-purpose I/O (GPIO) connection. The frame router 267 comprises the D-PHY transmit port 265 and a D-PHY receiver 266 that receives image sensor data provided by the user-facing camera 270 via a connection 231 comprising a four-wire MIPI Camera Serial Interface 2 (CSI2) connection. The LCH 260 communicates with a touch controller 285 via a connection 232 that can comprise an eight-wire serial peripheral interface (SPI) or a four-wire I2C connection.

The audio module 264 comprises one or more DSPs 281, a neural network accelerator 282, an audio preprocessor 284, and a memory 283. In some embodiments, the lid 220 comprises four microphones 290 and the audio module 264 comprises four DSPs 281, one for each microphone. In some embodiments, each DSP 281 is a Cadence® Tensilica® HiFi DSP. The audio module 264 communicates with the one or more microphones 290 via a connection 229 that comprises a MIPI SoundWire® connection or signals sent via pulse-density modulation (PDM). In other embodiments, the connection 229 comprises a four-wire digital microphone (DMIC) interface, a two-wire integrated inter-IC sound bus (I2S) connection, and one or more GPIO wires. The audio module 264 enables waking the device from a low-power state upon detecting a human voice (Wake on Voice) or the voice of an authenticated user (Speaker ID), near- and far-field audio (input and output), and can perform additional speech recognition tasks. In some embodiments, the NNA 282 is an artificial neural network accelerator implementing one or more artificial intelligence (AI) models to enable various LCH functions. For example, the NNA 282 can implement an AI model trained to detect a wake word or phrase in audio sensor data generated by the one or more microphones 290 to enable a Wake on Voice feature.

In some embodiments, the security/host module memory 274, the vision/imaging module memory 277, and the audio module memory 283 are part of a shared memory accessible to the security/host module 261, the vision/imaging module 263, and the audio module 264. During startup of the device 200, a section of the shared memory is assigned to each of the security/host module 261, the vision/imaging module 263, and the audio module 264. After startup, each section of shared memory assigned to a module is firewalled from the other assigned sections. In some embodiments, the shared memory can be a 12 MB memory partitioned as follows: security/host memory (1 MB), vision/imaging memory (3 MB), and audio memory (8 MB).

Any connection described herein connecting two or more components can utilize a different interface, protocol, or connection technology and/or utilize a different number of wires than that described for a particular connection. Although the display module 241, integrated sensor hub 242, audio capture module 243, USB module 244, and image processing module 245 are illustrated as being integrated into the SoC 240, in other embodiments, one or more of these components can be located external to the SoC. For example, one or more of these components can be located on a die, in a package, or on a board separate from a die, package, or board comprising host processor units (e.g., cores 235).

Figure 3:
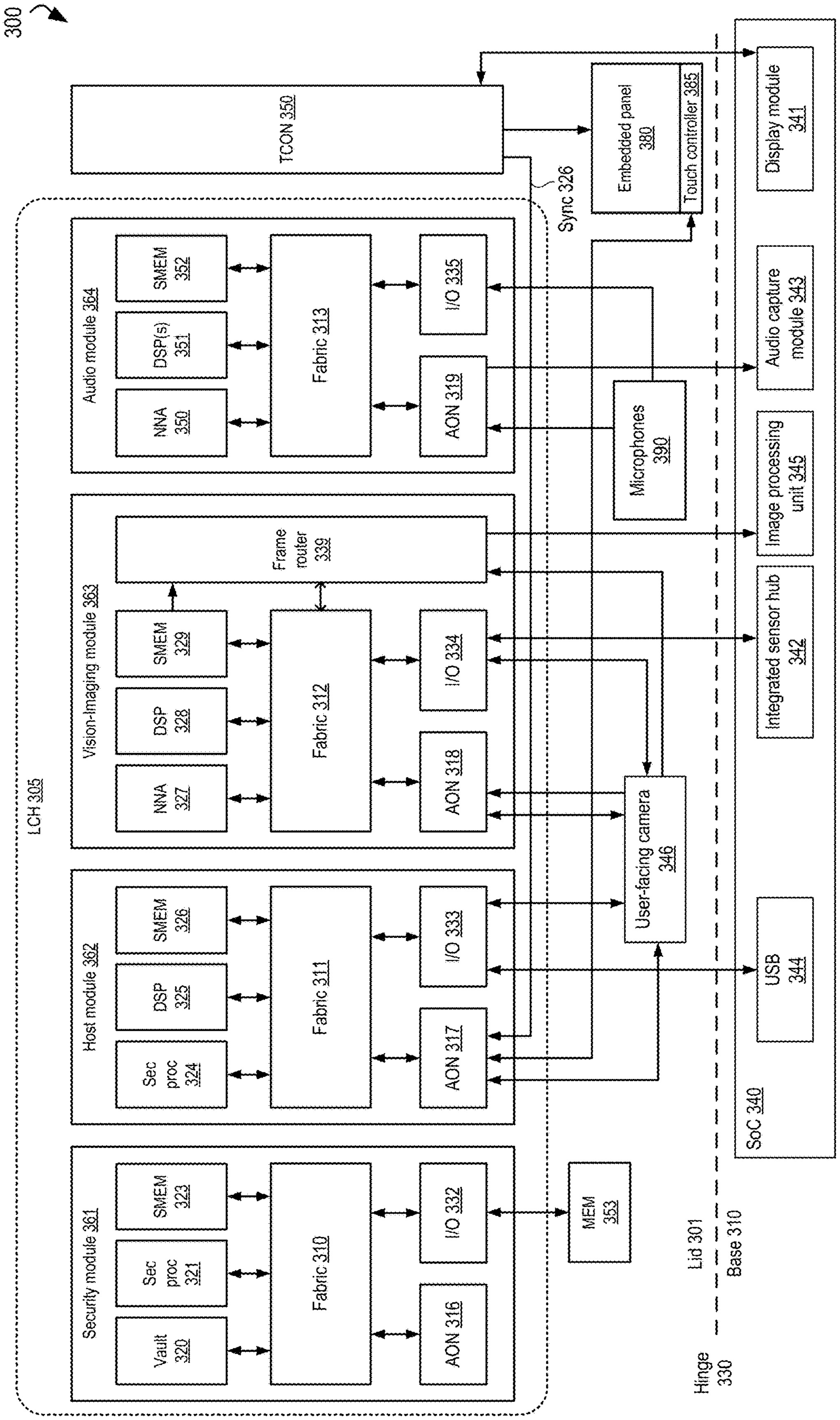
FIG. 3 is a block diagram of a fourth example mobile computing device comprising a lid controller hub.

FIG. 3 illustrates a block diagram of a fourth example mobile computing device comprising a lid controller hub. The mobile computing device 300 comprises a lid 301 connected to a base 315 via a hinge 330. The lid 301 comprises a lid controller hub (LCH) 305, a timing controller 355, a user-facing camera 346, microphones 390, an embedded display panel 380, a touch controller 385, and a memory 353. The LCH 305 comprises a security module 361, a host module 362, a vision/imaging module 363, and an audio module 364. The security module 361 provides a secure processing environment for the LCH 305 and comprises a vault 320, a security processor 321, a fabric 310, I/Os 332, an always-on (AON) block 316, and a memory 323. The security module 361 is responsible for loading and authenticating firmware stored in the memory 353 and executed by various components (e.g., DSPs, neural network accelerators) of the LCH 305. The security module 361 authenticates the firmware by executing a cryptographic hash function on the firmware and making sure the resulting hash is correct and that the firmware has a proper signature using key information stored in the security module 361. The cryptographic hash function is executed by the vault 320. In some embodiments, the vault 320 comprises a cryptographic accelerator. In some embodiments, the security module 361 can present a product root of trust (PRoT) interface by which another component of the device 200 can query the LCH 305 for the results of the firmware authentication. In some embodiments, a PRoT interface can be provided over an I2C/I3C interface (e.g., I2C/I3C interface 470).

As used herein, the terms "operating", "executing", or "running" as they pertain to software or firmware in relation to a lid controller hub, a lid controller hub component, host processor unit, SoC, or other computing device component are used interchangeably and can refer to software or firmware stored in one or more computer-readable storage media accessible by the computing device component, even though the instructions contained in the software or firmware are not being actively executed by the component.

The security module 361 also stores privacy information and handles privacy tasks. In some embodiments, information that the LCH 305 uses to perform Face ID or Speaker ID to wake a computing device if an authenticated user's voice is picked up by the microphone or if an authenticated user's face is captured by a camera is stored in the security module 361. The security module 361 also enables privacy modes for an LCH or a computing device. For example, if user input indicates that a user desires to enable a privacy mode, the security module 361 can disable access by LCH resources to sensor data generated by one or more of the lid input devices (e.g., touchscreen, microphone, camera). In some embodiments, a user can set a privacy setting to cause a device to enter a privacy mode. Privacy settings include, for example, disabling video and/or audio input in a videoconferencing application or enabling an operating system level privacy setting that prevents any application or the operating system from receiving and/or processing sensor data. Setting an application or operating system privacy setting can cause information to be sent to the lid controller hub to cause the LCH to enter a privacy mode. In a privacy mode, the lid controller hub can cause an input sensor to enter a low-power state, prevent LCH resources from processing sensor data or prevent raw or processed sensor data from being sent to a host processing unit.

In some embodiments, the LCH 305 can enable Wake on Face or Face ID features while keeping image sensor data private from the remainder of the system (e.g., the operating system and any applications running on the operating system). In some embodiments, the vision/imaging module 363 continues to process image sensor data to allow Wake on Face or Face ID features to remain active while the device is in a privacy mode. In some embodiments, image sensor data is passed through the vision/imaging module 363 to an image processing module 345 in the SoC 340 only when a face (or an authorized user's face) is detected, irrespective of whether a privacy mode is enabled, for enhanced privacy and reduced power consumption. In some embodiments, the mobile computing device 300 can comprise one or more world-facing cameras in addition to user-facing camera 346 as well as one or more world-facing microphones (e.g., microphones incorporated into the "A cover" of a laptop).

In some embodiments, the lid controller hub 305 enters a privacy mode in response to a user pushing a privacy button, flipping a privacy switch, or sliding a slider over an input sensor in the lid. In some embodiments, a privacy indicator can be provided to the user to indicate that the LCH is in a privacy mode. A privacy indicator can be, for example, an LED located in the base or display bezel or a privacy icon displayed on a display. In some embodiments, a user activating an external privacy button, switch, slider, hotkey, etc. enables a privacy mode that is set at a hardware level or system level. That is, the privacy mode applies to all applications and the operating system operating on the mobile computing device. For example, if a user presses a privacy switch located in the bezel of the lid, the LCH can disable all audio sensor data and all image sensor data from being made available to the SoC in response. Audio and image sensor data is still available to the LCH to perform tasks such as Wake of Voice and Speaker ID, but the audio and image sensor data accessible to the lid controller hub is not accessible to other processing components.

The host module 362 comprises a security processor 324, a DSP 325, a memory 326, a fabric 311, an always-on block 317, and I/Os 333. In some embodiments, the host module 362 can boot the LCH, send LCH telemetry and interrupt data to the SoC, manage interaction with the touch controller 385, and send touch sensor data to the SoC 340. The host module 362 sends lid sensor data from multiple lid sensors over a USB connection to a USB module 344 in the SoC 340. Sending sensor data for multiple lid sensors over a single connection contributes to the reduction in the number of wires passing through the hinge 330 relative to existing laptop designs. The DSP 325 processes touch sensor data received from the touch controller 385. The host module 362 can synchronize the sending of touch sensor data to the SoC 340 with the display panel refresh rate by utilizing a synchronization signal 370 shared between the TCON 355 and the host module 362.

The host module 362 can dynamically adjust the refresh rate of the display panel 380 based on factors such as user presence and the amount of user touch interaction with the panel 380. For example, the host module 362 can reduce the refresh rate of the panel 380 if no user is detected or an authorized user is not detected in front of the camera 346. In another example, the refresh rate can be increased in response to detection of touch interaction at the panel 380 based on touch sensor data. In some embodiments and depending upon the refresh rate capabilities of the display panel 380, the host module 362 can cause the refresh rate of the panel 380 to be increased up to 120 Hz or down to 20 Hz or less.

The host module 362 can also adjust the refresh rate based on the application that a user is interacting with. For example, if the user is interacting with an illustration application, the host module 362 can increase the refresh rate (which can also increase the rate at which touch data is sent to the SoC 340 if the display panel refresh rate and the processing of touch sensor data are synchronized) to 120 Hz to provide for a smoother touch experience to the user. Similarly, if the host module 362 detects that the application that a user is currently interacting with is one where the content is relatively static or is one that involves a low degree of user touch interaction or simple touch interactions (e.g., such as selecting an icon or typing a message), the host module 362 can reduce the refresh rate to a lower frequency. In some embodiments, the host module 362 can adjust the refresh rate and touch sampling frequency by monitoring the frequency of touch interaction. For example, the refresh rate can be adjusted upward if there is a high degree of user interaction or if the host module 362 detects that the user is utilizing a specific touch input device (e.g., a stylus) or a particular feature of a touch input stylus (e.g., a stylus' tilt feature). If supported by the display panel, the host module 362 can cause a strobing feature of the display panel to be enabled to reduce ghosting once the refresh rate exceeds a threshold value.

The vision/imaging module 363 comprises a neural network accelerator 327, a DSP 328, a memory 329, a fabric 312, an AON block 318, I/Os 334, and a frame router 339. The vision/imaging module 363 interacts with the user-facing camera 346. The vision/imaging module 363 can interact with multiple cameras and consolidate image data from multiple cameras into a single stream for transmission to an integrated sensor hub 342 in the SoC 340. In some embodiments, the lid 301 can comprise one or more additional user-facing cameras and/or world-facing cameras in addition to user-facing camera 346. In some embodiments, any of the user-facing cameras can be in-display cameras. Image sensor data generated by the camera 346 is received by the frame router 339 where it undergoes preprocessing before being sent to the neural network accelerator 327 and/or the DSP 328. The image sensor data can also be passed through the frame router 339 to an image processing module 345 in the SoC 340. The neural network accelerator 327 and/or the DSP 328 enable face detection, head orientation detection, the recognition of facial landmarks (e.g., eyes, cheeks, eyebrows, nose, mouth), the generation of a 3D mesh that fits a detected face, along with other image processing functions. In some embodiments, facial parameters (e.g., location of facial landmarks, 3D meshes, face physical dimensions, head orientation) can be sent to the SoC at a rate of 30 frames per second (30 fps).

The audio module 364 comprises a neural network accelerator 350, one or more DSPs 351, a memory 352, a fabric 313, an AON block 319, and I/Os 335. The audio module 364 receives audio sensor data from the microphones 390. In some embodiments, there is one DSP 351 for each microphone 390. The neural network accelerator 350 and DSP 351 implement audio processing algorithms and AI models that improve audio quality. For example, the DSPs 351 can perform audio preprocessing on received audio sensor data to condition the audio sensor data for processing by audio AI models implemented by the neural network accelerator 350. One example of an audio AI model that can be implemented by the neural network accelerator 350 is a noise reduction algorithm that filters out background noises, such as the barking of a dog or the wailing of a siren. A second example is models that enable Wake on Voice or Speaker ID features. A third example is context awareness models. For example, audio contextual models can be implemented that classify the occurrence of an audio event relating to a situation where law enforcement or emergency medical providers are to be summoned, such as the breaking of glass, a car crash, or a gun shot. The LCH can provide information to the SoC indicating the occurrence of such an event and the SoC can query to the user whether authorities or medical professionals should be summoned.

The AON blocks 316-319 in the LCH modules 361-364 comprises various I/Os, timers, interrupts, and control units for supporting LCH "always-on" features, such as Wake on Voice, Speaker ID, Wake on Face, and Face ID and an always-on display that is visible and presents content when the lid 301 is closed.

Figure 4:
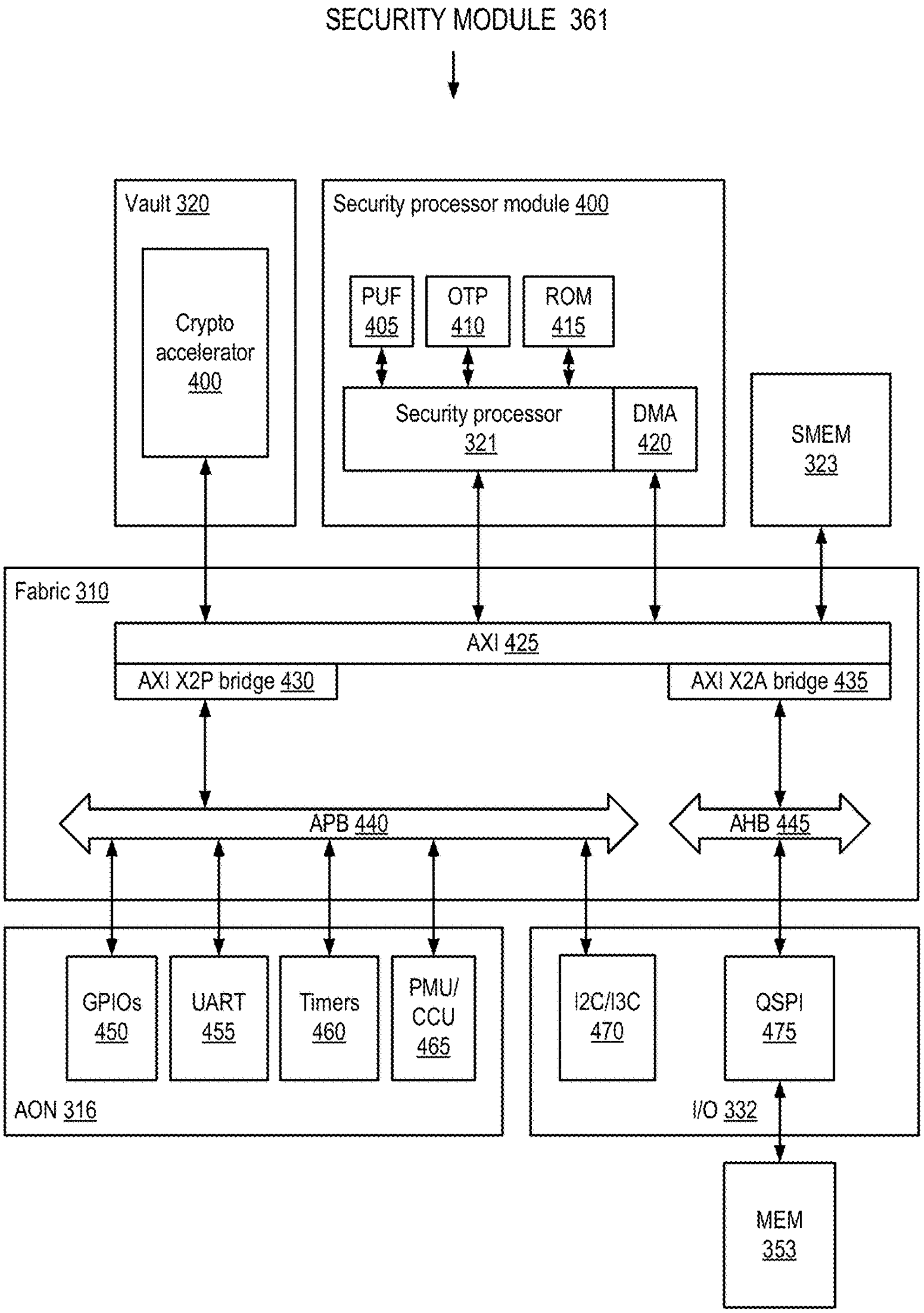
FIG. 4 is a block diagram of the security module of the lid controller hub of FIG. 3.

FIG. 4 illustrates a block diagram of the security module of the lid controller hub of FIG. 3. The vault 320 comprises a cryptographic accelerator 400 that can implement the cryptographic hash function performed on the firmware stored in the memory 353. In some embodiments, the cryptographic accelerator 400 implements a 128-bit block size advanced encryption standard (AES)-compliant (AES-128) or a 384-bit secure hash algorithm (SHA)-complaint (SHA-384) encryption algorithm. The security processor 321 resides in a security processor module 402 that also comprises a platform unique feature module (PUF) 405, an OTP generator 410, a ROM 415, and a direct memory access (DMA) module 420. The PUF 405 can implement one or more security-related features that are unique to a particular LCH implementation. In some embodiments, the security processor 321 can be a DesignWare® ARC® SEM security processor. The fabric 310 allows for communication between the various components of the security module 361 and comprises an advanced extensible interface (AXI) 425, an advanced peripheral bus (APB) 440, and an advanced high-performance bus (AHB) 445. The AXI 425 communicates with the advanced peripheral bus 440 via an AXI to APB (AXI X2P) bridge 430 and the advanced high-performance bus 445 via an AXI to AHB (AXI X2A) bridge 435. The always-on block 316 comprises a plurality of GPIOs 450, a universal asynchronous receiver-transmitter (UART) 455, timers 460, and power management and clock management units (PMU/CMU) 465. The PMU/CMU 465 controls the supply of power and clock signals to LCH components and can selectively supply power and clock signals to individual LCH components so that only those components that are to be in use to support a particular LCH operational mode or feature receive power and are clocked. The I/O set 332 comprises an I2C/I3C interface 470 and a queued serial peripheral interface (QSPI) 475 to communicate to the memory 353. In some embodiments, the memory 353 is a 16 MB serial peripheral interface (SPI)-NOR flash memory that stores the LCH firmware. In some embodiments, an LCH security module can exclude one or more of the components shown in FIG. 4. In some embodiments, an LCH security module can comprise one or more additional components beyond those shown in FIG. 4.

Figure 5:
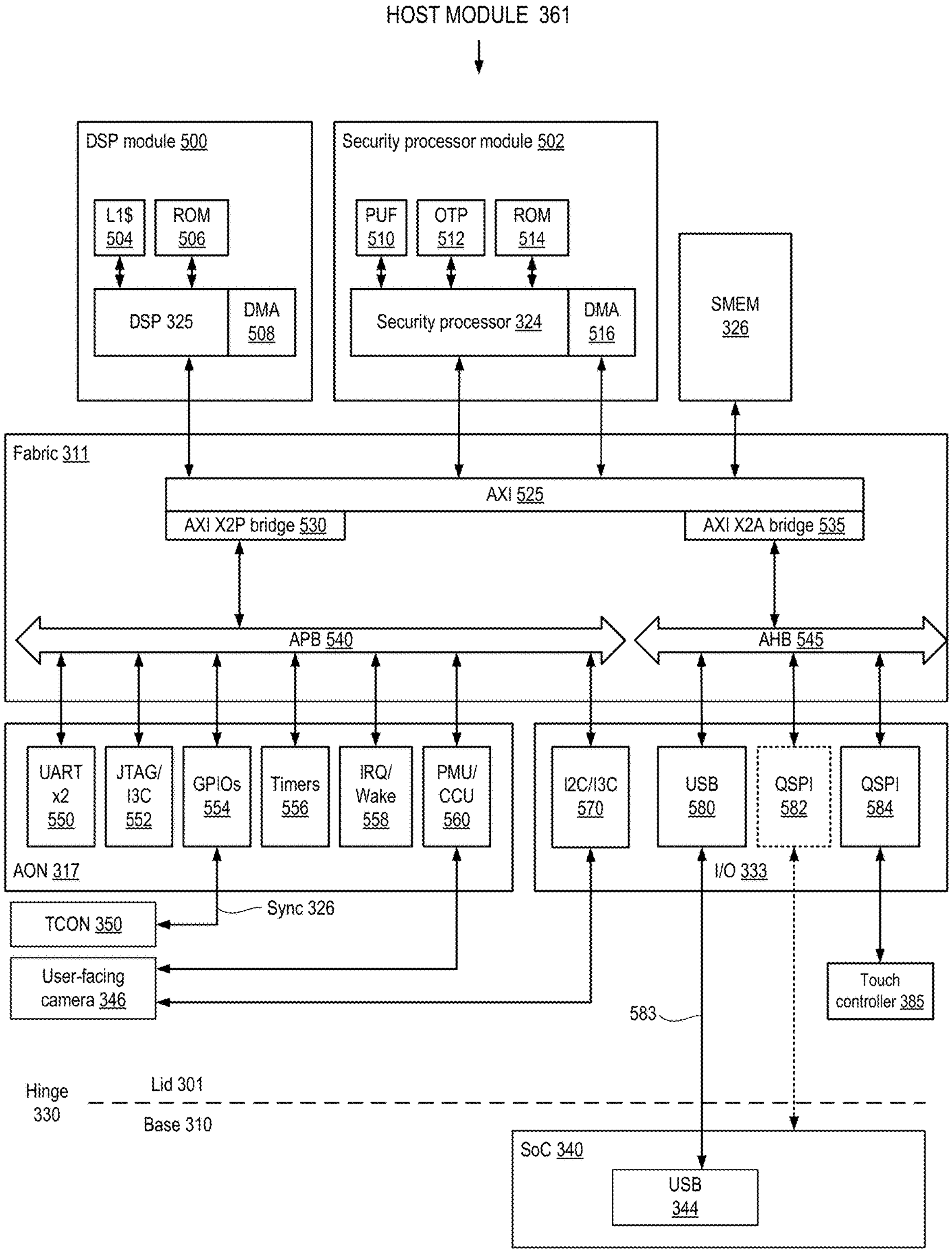
FIG. 5 is a block diagram of the host module of the lid controller hub of FIG. 3

FIG. 5 illustrates a block diagram of the host module of the lid controller hub of FIG. 3. The DSP 325 is part of a DSP module 500 that further comprises a level one (L1) cache 504, a ROM 506, and a DMA module 508. In some embodiments, the DSP 325 can be a DesignWare® ARC® EM11D DSP processor. The security processor 324 is part of a security processor module 502 that further comprises a PUF module 510 to allow for the implementation of platform-unique functions, an OTP generator 512, a ROM 514, and a DMA module 516. In some embodiments, the security processor 324 is a Synopsis® DesignWare® ARC® SEM security processor. The fabric 311 allows for communication between the various components of the host module 362 and comprises similar components as the security component fabric 310. The always-on block 317 comprises a plurality of UARTs 550, a Joint Test Action Group (JTAG)/I3C port 552 to support LCH debug, a plurality of GPIOs 554, timers 556, an interrupt request (IRQ)/wake block 558, and a PMU/CCU port 560 that provides a 19.2 MHz reference clock to the camera 346. The synchronization signal 370 is connected to one of the GPIO ports. I/Os 333 comprises an interface 570 that supports I2C and/or I3C communication with the camera 346, a USB module 580 that communicates with the USB module 344 in the SoC 340, and a QSPI block 584 that communicates with the touch controller 385. In some embodiments, the I/O set 333 provides touch sensor data with the SoC via a QSPI interface 582. In other embodiments, touch sensor data is communicated with the SoC over the USB connection 583. In some embodiments, the connection 583 is a USB 2.0 connection. By leveraging the USB connection 583 to send touch sensor data to the SoC, the hinge 330 is spared from having to carry the wires that support the QSPI connection supported by the QSPI interface 582. Not having to support this additional QSPI connection can reduce the number of wires crossing the hinge by four to eight wires.

In some embodiments, the host module 362 can support dual displays. In such embodiments, the host module 362 communicates with a second touch controller and a second timing controller. A second synchronization signal between the second timing controller and the host module allows for the processing of touch sensor data provided by the second touch controller and the sending of touch sensor data provided by the second touch sensor delivered to the SoC to be synchronized with the refresh rate of the second display. In some embodiments, the host module 362 can support three or more displays. In some embodiments, an LCH host module can exclude one or more of the components shown in FIG. 5. In some embodiments, an LCH host module can comprise one or more additional components beyond those shown in FIG. 5.

Figure 6:
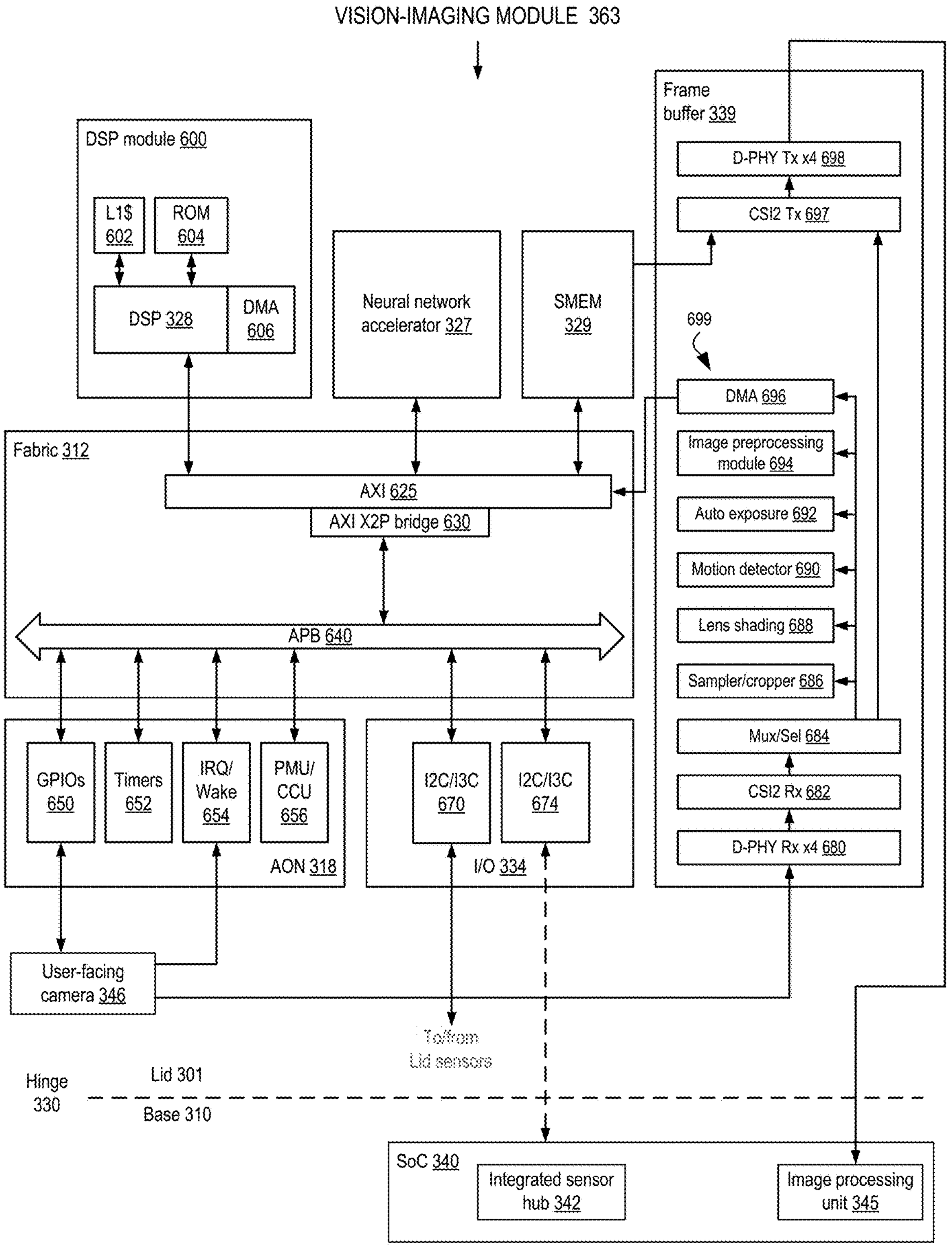
FIG. 6 is a block diagram of the vision-imaging module of the lid controller hub of FIG. 3

FIG. 6 illustrates a block diagram of the vision/imaging module of the lid controller hub of FIG. 3. The DSP 328 is part of a DSP module 600 that further comprises an L1 cache 602, a ROM 604, and a DMA module 606. In some embodiments, the DSP 328 can be a DesignWare® ARC® EM11D DSP processor. The fabric 312 allows for communication between the various components of the vision/imaging module 363 and comprises an advanced extensible interface (AXI) 625 connected to an advanced peripheral bus (APB) 640 by an AXI to APB (X2P) bridge 630. The always-on block 318 comprises a plurality of GPIOs 650, a plurality of timers 652, an IRQ/wake block 654, and a PMU/CCU 656. In some embodiments, the IRQ/wake block 654 receives a Wake on Motion (WoM) interrupt from the camera 346. The WoM interrupt can be generated based on accelerometer sensor data generated by an accelerator located in or communicatively coupled to the camera or generated in response to the camera performing motion detection processing in images captured by the camera. The I/Os 334 comprise an I2C/I3C interface 674 that sends metadata to the integrated sensor hub 342 in the SoC 340 and an I2C3/I3C interface 670 that connects to the camera 346 and other lid sensors 671 (e.g., radar sensor, time-of-flight camera, infrared). The vision/imaging module 363 can receive sensor data from the additional lid sensors 671 via the I2C/I3C interface 670. In some embodiments, the metadata comprises information such as information indicating whether information being provided by the lid controller hub is valid, information indicating an operational mode of the lid controller hub (e.g., off, a "Wake on Face" low power mode in which some of the LCH components are disabled but the LCH continually monitors image sensor data to detect a user's face), auto exposure information (e.g., the exposure level automatically set by the vision/imaging module 363 for the camera 346), and information relating to faces detected in images or video captured by the camera 346 (e.g., information indicating a confidence level that a face is present, information indicating a confidence level that the face matches an authorized user's face, bounding box information indicating the location of a face in a captured image or video, orientation information indicating an orientation of a detected face, and facial landmark information).

The frame router 339 receives image sensor data from the camera 346 and can process the image sensor data before passing the image sensor data to the neural network accelerator 327 and/or the DSP 328 for further processing. The frame router 339 also allows the received image sensor data to bypass frame router processing and be sent to the image processing module 345 in the SoC 340. Image sensor data can be sent to the image processing module 345 concurrently with being processed by a frame router processing stack 699. Image sensor data generated by the camera 346 is received at the frame router 339 by a MIPI D-PHY receiver 680 where it is passed to a MIPI CSI2 receiver 682. A multiplexer/selector block 684 allows the image sensor data to be processed by the frame router processing stack 699, to be sent directly to a CSI2 transmitter 697 and a D-PHY transmitter 698 for transmission to the image processing module 345, or both.

The frame router processing stack 699 comprises one or more modules that can perform preprocessing of image sensor data to condition the image sensor data for processing by the neural network accelerator 327 and/or the DSP 328, and perform additional image processing on the image sensor data. The frame router processing stack 699 comprises a sampler/cropper module 686, a lens shading module 688, a motion detector module 690, an auto exposure module 692, an image preprocessing module 694, and a DMA module 696. The sampler/cropper module 686 can reduce the frame rate of video represented by the image sensor data and/or crops the size of images represented by the image sensor data. The lens shading module 688 can apply one or more lens shading effect to images represented by the image sensor data. In some embodiments, a lens shading effects to be applied to the images represented by the image sensor data can be user selected. The motion detector 690 can detect motion across multiple images represented by the image sensor data. The motion detector can indicate any motion or the motion of a particular object (e.g., a face) over multiple images.

The auto exposure module 692 can determine whether an image represented by the image sensor data is over-exposed or under-exposed and cause the exposure of the camera 346 to be adjusted to improve the exposure of future images captured by the camera 346. In some embodiments, the auto exposure module 362 can modify the image sensor data to improve the quality of the image represented by the image sensor data to account for over-exposure or under-exposure. The image preprocessing module 694 performs image processing of the image sensor data to further condition the image sensor data for processing by the neural network accelerator 327 and/or the DSP 328. After the image sensor data has been processed by the one or more modules of the frame router processing stack 699 it can be passed to other components in the vision/imaging module 363 via the fabric 312. In some embodiments, the frame router processing stack 699 contains more or fewer modules than those shown in FIG. 6. In some embodiments, the frame router processing stack 699 is configurable in that image sensor data is processed by selected modules of the frame processing stack. In some embodiments, the order in which modules in the frame processing stack operate on the image sensor data is configurable as well.

Once image sensor data has been processed by the frame router processing stack 699, the processed image sensor data is provided to the DSP 328 and/or the neural network accelerator 327 for further processing. The neural network accelerator 327 enables the Wake on Face function by detecting the presence of a face in the processed image sensor data and the Face ID function by detecting the presence of the face of an authenticated user in the processed image sensor data. In some embodiments, the NNA 327 is capable of detecting multiple faces in image sensor data and the presence of multiple authenticated users in image sensor data. The neural network accelerator 327 is configurable and can be updated with information that allows the NNA 327 to identify one or more authenticated users or identify a new authenticated user. In some embodiments, the NNA 327 and/or DSP 328 enable one or more adaptive dimming features. One example of an adaptive dimming feature is the dimming of image or video regions not occupied by a human face, a useful feature for video conferencing or video call applications. Another example is globally dimming a screen while a computing device is in an active state and a face is longer detected in front of the camera and then undimming the display when the face is again detected. If this latter adaptive dimming feature is extended to incorporate Face ID, the screen is undimmed only when an authenticated user is again detected.

In some embodiments, the frame router processing stack 699 comprises a super resolution module (not shown) that can upscale or downscale the resolution of an image represented by image sensor data. For example, in embodiments where image sensor data represents 1-megapixel images, a super resolution module can upscale the 1-megapixel images to higher resolution images before they are passed to the image processing module 345. In some embodiments, an LCH vision/imaging module can exclude one or more of the components shown in FIG. 6. In some embodiments, an LCH vision/imaging module can comprise one or more additional components beyond those shown in FIG. 6.

Figure 7:
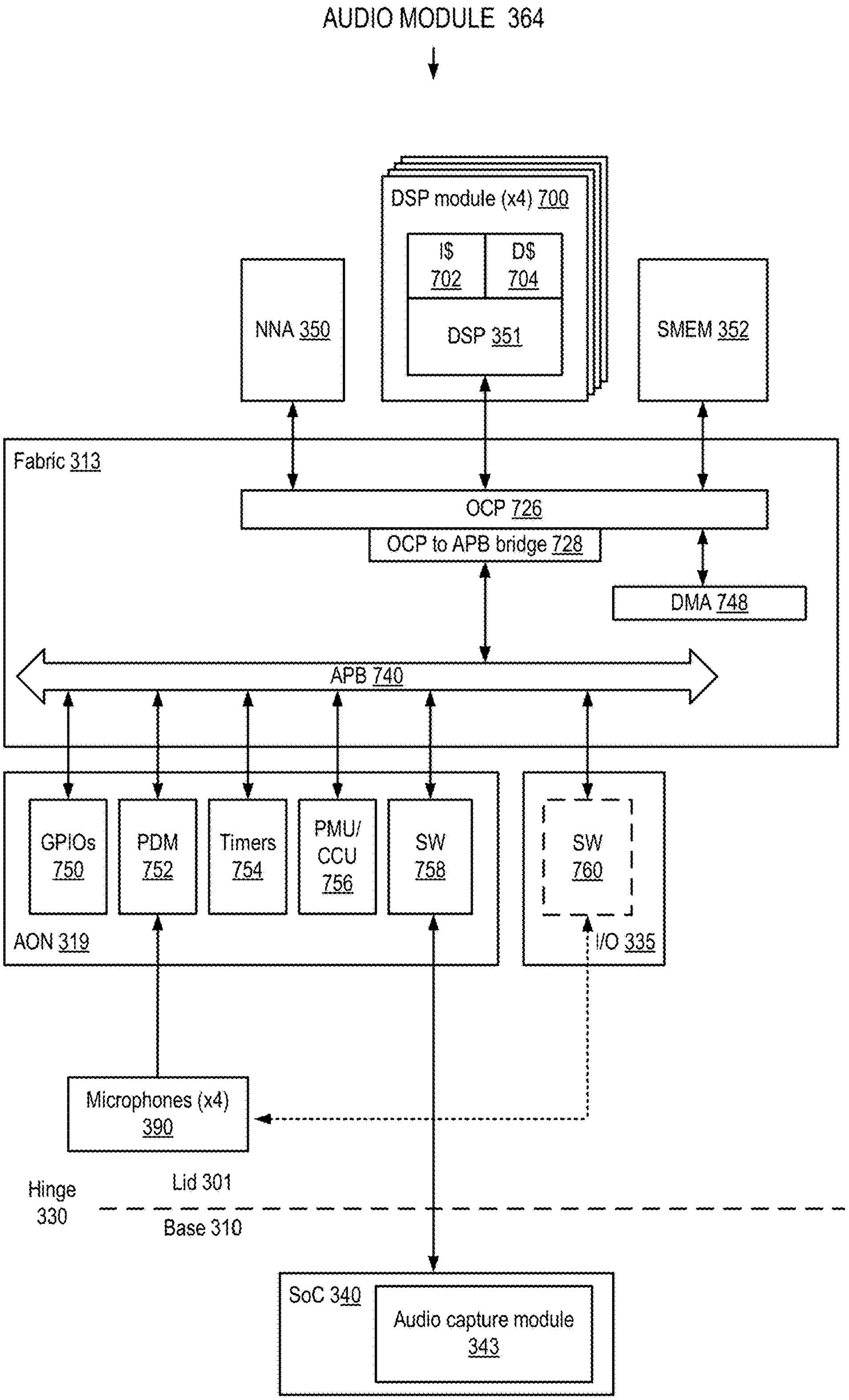
FIG. 7 is a block diagram of the audio module of the lid controller hub of FIG. 3.

FIG. 7 illustrates a block diagram of the audio module 364 of the lid controller hub of FIG. 3. In some embodiments, the NNA 350 can be an artificial neural network accelerator. In some embodiments, the NNA 350 can be an Intel® Gaussian & Neural Accelerator (GNA) or other low-power neural coprocessor. The DSP 351 is part of a DSP module 700 that further comprises an instruction cache 702 and a data cache 704. In some embodiments, each DSP 351 is a Cadence® Tensilica® HiFi DSP. The audio module 364 comprises one DSP module 700 for each microphone in the lid. In some embodiments, the DSP 351 can perform dynamic noise reduction on audio sensor data. In other embodiments, more or fewer than four microphones can be used, and audio sensor data provided by multiple microphones can be processed by a single DSP 351. In some embodiments, the NNA 350 implements one or more models that improve audio quality. For example, the NNA 350 can implement one or more "smart mute" models that remove or reduce background noises that can be disruptive during an audio or video call.

In some embodiments, the DSPs 351 can enable far-field capabilities. For example, lids comprising multiple front-facing microphones distributed across the bezel (or over the display area if in-display microphones are used) can perform beamforming or spatial filtering on audio signals generated by the microphones to allow for far-field capabilities (e.g., enhanced detection of sound generated by a remote acoustic source). The audio module 364, utilizing the DSP 351*s*, can determine the location of a remote audio source to enhance the detection of sound received from the remote audio source location. In some embodiments, the DSPs 351 can determine the location of an audio source by determining delays to be added to audio signals generated by the microphones such that the audio signals overlap in time and then inferring the distance to the audio source from each microphone based on the delay added to each audio signal. By adding the determined delays to the audio signals provided by the microphones, audio detection in the direction of a remote audio source can be enhanced. The enhanced audio can be provided to the NNA 350 for speech detection to enable Wake on Voice or Speaker ID features. The enhanced audio can be subjected to further processing by the DSPs 351 as well. The identified location of the audio source can be provided to the SoC for use by the operating system or an application running on the operating system.

In some embodiments, the DSPs 351 can detect information encoded in audio sensor data at near-ultrasound (e.g., 15 kHz-20 kHz) or ultrasound (e.g., >20 kHz) frequencies, thus providing for a low-frequency low-power communication channel. Information detected in near-ultrasound/ultrasound frequencies can be passed to the audio capture module 343 in the SoC 340. An ultrasonic communication channel can be used, for example, to communicate meeting connection or Wi-Fi connection information to a mobile computing device by another computing device (e.g., Wi-Fi router, repeater, presentation equipment) in a meeting room. The audio module 364 can further drive the one or more microphones 390 to transmit information at ultrasonic frequencies. Thus, the audio channel can be used as a two-way low-frequency low-power communication channel between computing devices.

In some embodiments, the audio module 364 can enable adaptive cooling. For example, the audio module 364 can determine an ambient noise level and send information indicating the level of ambient noise to the SoC. The SoC can use this information as a factor in determining a level of operation for a cooling fan of the computing device. For example, the speed of a cooling fan can be scaled up or down with increasing and decreasing ambient noise levels, which can allow for increased cooling performance in noisier environments.

The fabric 313 allows for communication between the various components of the audio module 364. The fabric 313 comprises open core protocol (OCP) interfaces 726 to connect the NNA 550, the DSP modules 700, the memory 352 and the DMA 748 to the APB 740 via an OCP to APB bridge 728. The always-on block 319 comprises a plurality of GPIOs 750, a pulse density modulation (PDM) module 752 that receives audio sensor data generated by the microphones 390, one or more timers 754, a PMU/CCU 756, and a MIPI SoundWire® module 758 for transmitting and receiving audio data to the audio capture module 343. In some embodiments, audio sensor data provided by the microphones 390 is received at a DesignWare® SoundWire® module 760. In some embodiments, an LCH audio module can exclude one or more of the components shown in FIG. 7. In some embodiments, an LCH audio module can comprise one or more additional components beyond those shown in FIG. 7.

Figure 8:
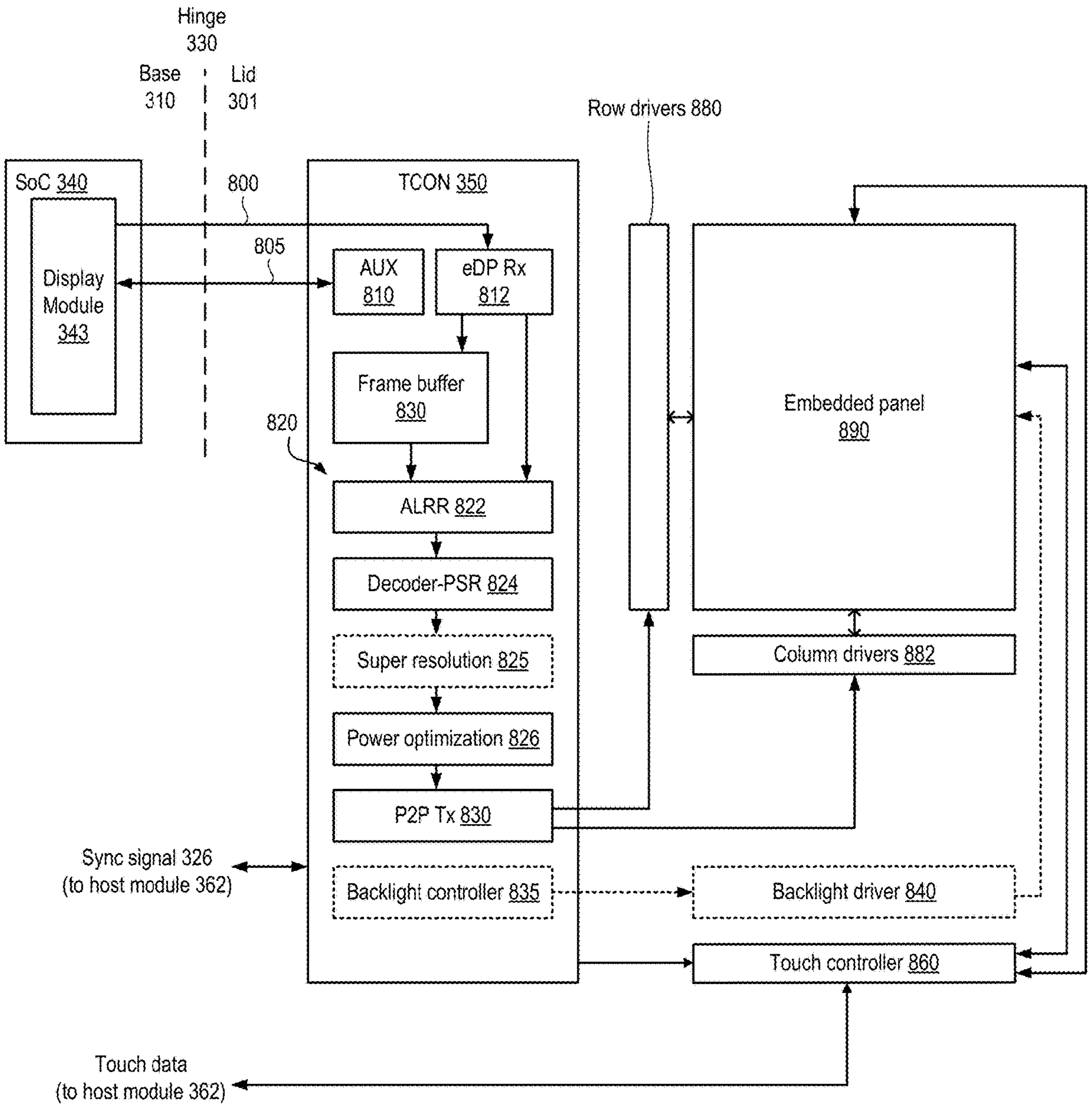
FIG. 8 is a block diagram of the timing controller, embedded display, and additional electronics used in conjunction with the lid controller hub of FIG. 3

FIG. 8 illustrates a block diagram of the timing controller, embedded display panel, and additional electronics used in conjunction with the lid controller hub of FIG. 3. The timing controller 355 receives video data from the display module 341 of the SoC 340 over an eDP connection comprising a plurality of main link lanes 800 and an auxiliary (AUX) channel 805. Video data and auxiliary channel information provided by the display module 341 is received at the TCON 355 by an eDP main link receiver 812 and an auxiliary channel receiver 810 and. A timing controller processing stack 820 comprises one or more modules responsible for pixel processing and converting the video data sent from the display module 341 into signals that drive the control circuitry of the display panel 380, (e.g., row drivers 882, column drivers 884). Video data can be processed by timing controller processing stack 820 without being stored in a frame buffer 830 or video data can be stored in the frame buffer 830 before processing by the timing controller processing stack 820. The frame buffer 830 stores pixel information for one or more video frames (or frames, as used herein, the terms "image" and "frame" are used interchangeably). For example, in some embodiments, a frame buffer can store the color information for pixels in a video frame to be displayed on the panel.

The timing controller processing stack 820 comprises an autonomous low refresh rate module (ALRR) 822, a decoder-panel self-refresh (decoder-PSR) module 824, and a power optimization module 826. The ALRR module 822 can dynamically adjust the refresh rate of the display 380. In some embodiments, the ALRR module 822 can adjust the display refresh rate between 20 Hz and 120 Hz. The ALRR module 822 can implement various dynamic refresh rate approaches, such as adjusting the display refresh rate based on the frame rate of received video data, which can vary in gaming applications depending on the complexity of images being rendered. A refresh rate determined by the ALRR module 822 can be provided to the host module as the synchronization signal 370. In some embodiments, the synchronization signal comprises an indication that a display refresh is about to occur. In some embodiments, the ALRR module 822 can dynamically adjust the panel refresh rate by adjusting the length of the blanking period. In some embodiments, the ALRR module 822 can adjust the panel refresh rate based on information received from the host module 362. For example, in some embodiments, the host module 362 can send information to the ALRR module 822 indicating that the refresh rate is to be reduced if the vision/imaging module 363 determines there is no user in front of the camera. In some embodiments, the host module 362 can send information to the ALRR module 822 indicating that the refresh rate is to be increased if the host module 362 determines that there is touch interaction at the panel 380 based on touch sensor data received from the touch controller 385.

In some embodiments, the decoder-PSR module 824 can comprise a Video Electronics Standards Association (VESA) Display Streaming Compression (VDSC) decoder that decodes video data encoded using the VDSC compression standard. In other embodiments, the decoder-panel self-refresh module 824 can comprise a panel self-refresh (PSR) implementation that, when enabled, refreshes all or a portion of the display panel 380 based on video data stored in the frame buffer and utilized in a prior refresh cycle. This can allow a portion of the display pipeline leading up to the frame buffer to enter into a low-power state. In some embodiments, the decoder-panel self-refresh module 824 can be the PSR feature implemented in eDP v1.3 or the PSR2 feature implemented in eDP v1.4. In some embodiments, the TCON can achieve additional power savings by entering a zero or low refresh state when the mobile computing device operating system is being upgraded. In a zero-refresh state, the timing controller does not refresh the display. In a low refresh state, the timing controller refreshes the display at a slow rate (e.g., 20 Hz or less).

In some embodiments, the timing controller processing stack 820 can include a super resolution module 825 that can downscale or upscale the resolution of video frames provided by the display module 341 to match that of the display panel 380. For example, if the embedded panel 380 is a 3K×2K panel and the display module 341 provides 4K video frames rendered at 4K, the super resolution module 825 can downscale the 4K video frames to 3K×2K video frames. In some embodiments, the super resolution module 825 can upscale the resolution of videos. For example, if a gaming application renders images with a 1360×768 resolution, the super resolution module 825 can upscale the video frames to 3K×2K to take full advantage of the resolution capabilities of the display panel 380. In some embodiments, a super resolution module 825 that upscales video frames can utilize one or more neural network models to perform the upscaling.

The power optimization module 826 comprises additional algorithms for reducing power consumed by the TCON 355. In some embodiments, the power optimization module 826 comprises a local contrast enhancement and global dimming module that enhances the local contrast and applies global dimming to individual frames to reduce power consumption of the display panel 380.

In some embodiments, the timing controller processing stack 820 can comprise more or fewer modules than shown in FIG. 8. For example, in some embodiments, the timing controller processing stack 820 comprises an ALRR module and an eDP PSR2 module but does not contain a power optimization module. In other embodiments, modules in addition to those illustrated in FIG. 8 can be included in the timing controller stack 820. The modules included in the timing controller processing stack 820 can depend on the type of embedded display panel 380 included in the lid 301. For example, if the display panel 380 is a backlit liquid crystal display (LCD), the timing controller processing stack 820 would not include a module comprising the global dimming and local contrast power reduction approach discussed above as that approach is more amenable for use with emissive displays (displays in which the light emitting elements are located in individual pixels, such as QLED, OLED, and micro-LED displays) rather than backlit LCD displays. In some embodiments, the timing controller processing stack 820 comprises a color and gamma correction module.

After video data has been processed by the timing controller processing stack 820, a P2P transmitter 880 converts the video data into signals that drive control circuitry for the display panel 380. The control circuitry for the display panel 380 comprises row drivers 882 and column drivers 884 that drive rows and columns of pixels in a display 380 within the embedded 380 to control the color and brightness of individual pixels.

In embodiments where the embedded panel 380 is a backlit LCD display, the TCON 355 can comprise a backlight controller 835 that generates signals to drive a backlight driver 840 to control the backlighting of the display panel 380. The backlight controller 835 sends signals to the backlight driver 840 based on video frame data representing the image to be displayed on the panel 380. The backlight controller 835 can implement low-power features such as turning off or reducing the brightness of the backlighting for those portions of the panel (or the entire panel) if a region of the image (or the entire image) to be displayed is mostly dark. In some embodiments, the backlight controller 835 reduces power consumption by adjusting the chroma values of pixels while reducing the brightness of the backlight such that there is little or no visual degradation perceived by a viewer. In some embodiments the backlight is controlled based on signals send to the lid via the eDP auxiliary channel, which can reduce the number of wires sent across the hinge 330.

The touch controller 385 is responsible for driving the touchscreen technology of the embedded panel 380 and collecting touch sensor data from the display panel 380. The touch controller 385 can sample touch sensor data periodically or aperiodically and can receive control information from the timing controller 355 and/or the lid controller hub 305. The touch controller 385 can sample touch sensor data at a sampling rate similar or close to the display panel refresh rate. The touch sampling can be adjusted in response to an adjustment in the display panel refresh rate. Thus, if the display panel is being refreshed at a low rate or not being refreshed at all, the touch controller can be placed in a low-power state in which it is sampling touch sensor data at a low rate or not at all. When the computing device exits the low-power state in response to, for example, the vision/imaging module 363 detecting a user in the image data being continually analyzed by the vision/imaging module 363, the touch controller 385 can increase the touch sensor sampling rate or begin sampling touch sensor data again. In some embodiments, as will be discussed in greater detail below, the sampling of touch sensor data can be synchronized with the display panel refresh rate, which can allow for a smooth and responsive touch experience. In some embodiments, the touch controller can sample touch sensor data at a rate that is independent from the display refresh rate.

Although the timing controllers 250 and 351 of FIGS. 2 and 3 are illustrated as being separate from lid controller hubs 260 and 305, respectively, any of the timing controllers described herein can be integrated onto the same die, package, or printed circuit board as a lid controller hub. Thus, reference to a lid controller hub can refer to a component that includes a timing controller and reference to a timing controller can refer to a component within a lid controller hub. FIGS. 10A-10D illustrate various possible physical relationships between a timing controller and a lid controller hub.

In some embodiments, a lid controller hub can have more or fewer components and/or implement fewer features or capabilities than the LCH embodiments described herein. For example, in some embodiments, a mobile computing device may comprise an LCH without an audio module and perform processing of audio sensor data in the base. In another example, a mobile computing device may comprise an LCH without a vision/imaging module and perform processing of image sensor data in the base.

Figure 9:
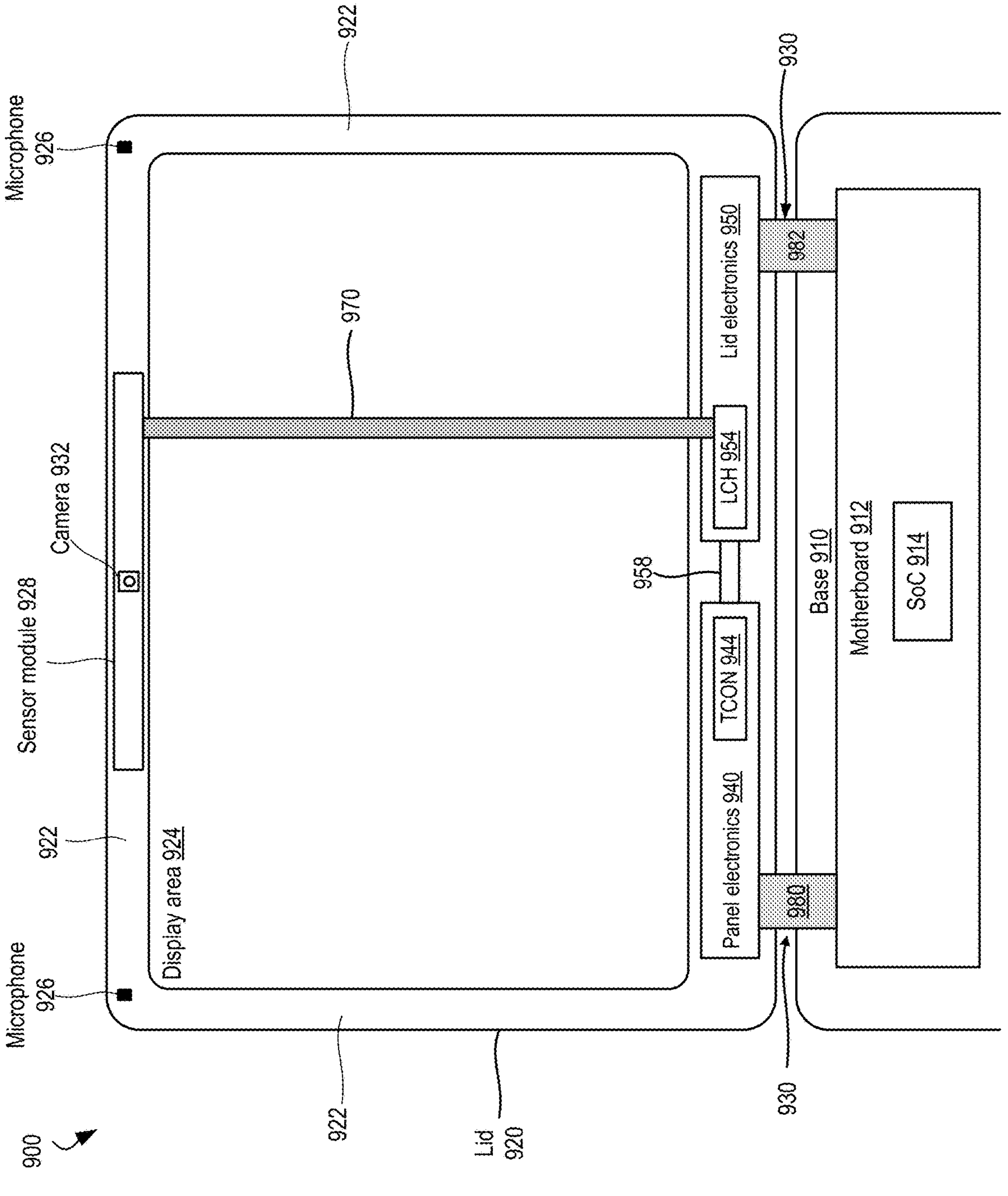
FIG. 9 is a block diagram illustrating an example physical arrangement of components in a mobile computing device comprising a lid controller hub.

FIG. 9 illustrates a block diagram illustrating an example physical arrangement of components in a mobile computing device comprising a lid controller hub. The mobile computing device 900 comprises a base 910 connected to a lid 920 via a hinge 930. The base 910 comprises a motherboard 912 on which an SoC 914 and other computing device components are located. The lid 920 comprises a bezel 922 that extends around the periphery of a display area 924, which is the active area of an embedded display panel 927 located within the lid, e.g., the portion of the embedded display panel that displays content. The lid 920 further comprises a pair of microphones 926 in the upper left and right corners of the lid 920, and a sensor module 928 located along a center top portion of the bezel 922. The sensor module 928 comprises a front-facing camera 932. In some embodiments, the sensor module 928 is a printed circuit board on which the camera 932 is mounted. The lid 920 further comprises panel electronics 940 and lid electronics 950 located in a bottom portion of the lid 920. The lid electronics 950 comprises a lid controller hub 954 and the panel electronics 940 comprises a timing controller 944. In some embodiments the lid electronics 950 comprises a printed circuit board on which the LCH 954 in mounted. In some embodiments the panel electronics 940 comprises a printed circuit board upon which the TCON 944 and additional panel circuitry is mounted, such as row and column drivers, a backlight driver (if the embedded display is an LCD backlit display), and a touch controller. The timing controller 944 and the lid controller hub 954 communicate via a connector 958 which can be a cable connector connecting two circuit boards. The connector 958 can carry the synchronization signal that allows for touch sampling activities to be synchronized with the display refresh rate. In some embodiments, the LCH 954 can deliver power to the TCON 944 and other electronic components that are part of the panel electronics 940 via the connector 958. A sensor data cable 970 carries image sensor data generated by the camera 932, audio sensor data generated by the microphones 926, a touch sensor data generated by the touchscreen technology to the lid controller hub 954. Wires carrying audio signal data generated by the microphones 926 can extend from the microphones 926 in the upper and left corners of the lid to the sensor module 928, where they aggregated with the wires carrying image sensor data generated by the camera 932 and delivered to the lid controller hub 954 via the sensor data cable 970.

The hinge 930 comprises a left hinge portion 980 and a right hinge portion 982. The hinge 930 physically couples the lid 920 to the base 910 and allows for the lid 920 to be rotated relative to the base. The wires connecting the lid controller hub 954 to the base 910 pass through one or both of the hinge portions 980 and 982. Although shown as comprising two hinge portions, the hinge 930 can assume a variety of different configurations in other embodiments. For example, the hinge 930 could comprise a single hinge portion or more than two hinge portions, and the wires that connect the lid controller hub 954 to the SoC 914 could cross the hinge at any hinge portion. With the number of wires crossing the hinge 930 being less than in existing laptop devices, the hinge 930 can be less expensive and simpler component relative to hinges in existing laptops.

In other embodiments, the lid 920 can have different sensor arrangements than that shown in FIG. 9. For example, the lid 920 can comprise additional sensors such as additional front-facing cameras, a front-facing depth sensing camera, an infrared sensor, and one or more world-facing cameras. In some embodiments, the lid 920 can comprise additional microphones located in the bezel, or just one microphone located on the sensor module. The sensor module 928 can aggregate wires carrying sensor data generated by additional sensors located in the lid and deliver them to the sensor data cable 970, which delivers the additional sensor data to the lid controller hub 954.

In some embodiments, the lid comprises in-display sensors such as in-display microphones or in-display cameras. These sensors are located in the display area 924, in pixel area not utilized by the emissive elements that generate the light for each pixel and are discussed in greater detail below. The sensor data generated by in-display cameras and in-display microphones can be aggregated by the sensor module 928 as well as other sensor modules located in the lid and deliver the sensor data generated by the in-display sensors to the lid controller hub 954 for processing.

In some embodiments, one or more microphones and cameras can be located in a position within the lid that is convenient for use in an "always-on" usage scenario, such as when the lid is closed. For example, one or more microphones and cameras can be located on the "A cover" of a laptop or other world-facing surface (such as a top edge or side edge of a lid) of a mobile computing device when the device is closed to enable the capture and monitoring of audio or image data to detect the utterance of a wake word or phrase or the presence of a person in the field of view of the camera.

Figure 10A:
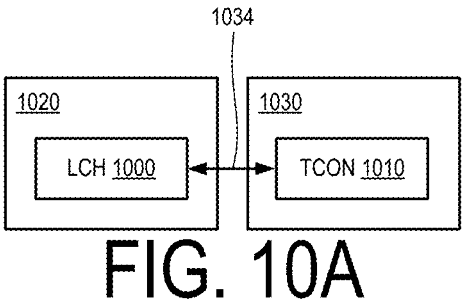
FIGS. 10A-10E are block diagrams of example timing controller and lid controller hub physical arrangements within a lid.
Figure 10B:
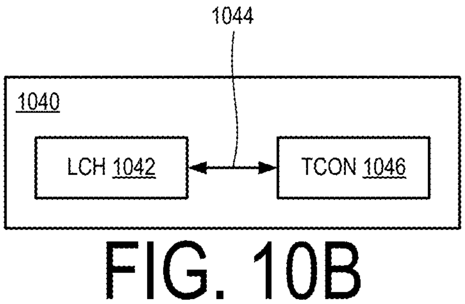

FIGS. 10A-10E illustrate block diagrams of example timing controller and lid controller hub physical arrangements within a lid. FIG. 10A illustrates a lid controller hub 1000 and a timing controller 1010 located on a first module 1020 that is physically separate from a second module 1030. In some embodiments, the first and second modules 1020 and 1030 are printed circuit boards. The lid controller hub 1000 and the timing controller 1010 communicate via a connection 1034. FIG. 10B illustrates a lid controller hub 1042 and a timing controller 1046 located on a third module 1040. The LCH 1042 and the TCON 1046 communicate via a connection 1044. In some embodiments, the third module 1040 is a printed circuit board and the connection 1044 comprises one or more printed circuit board traces. One advantage to taking a modular approach to lid controller hub and timing controller design is that it allows timing controller vendors to offer a single timing controller that works with multiple LCH designs having different feature sets.

Figure 10C:
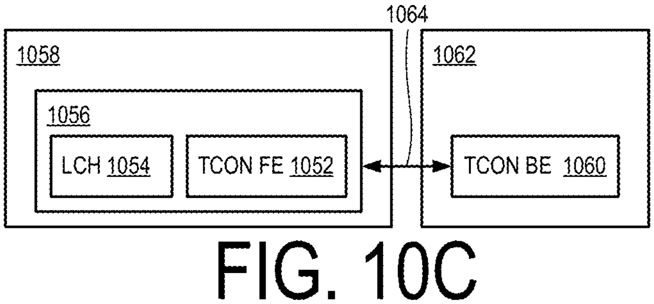

FIG. 10C illustrates a timing controller split into front end and back end components. A timing controller front end (TCON FE) 1052 and a lid controller hub 1054 are integrated in or are co-located on a first common component 1056. In some embodiments, the first common component 1056 is an integrated circuit package and the TCON FE 1052 and the LCH 1054 are separate integrated circuit die integrated in a multi-chip package or separate circuits integrated on a single integrated circuit die. The first common component 1056 is located on a fourth module 1058 and a timing controller back end (TCON BE) 1060 is located on a fifth module 1062. The timing controller front end and back end components communicate via a connection 1064. Breaking the timing controller into front end and back end components can provide for flexibility in the development of timing controllers with various timing controller processing stacks. For example, a timing controller back end can comprise modules that drive an embedded display, such as the P2P transmitter 880 of the timing controller processing stack 820 in FIG. 8 and other modules that may be common to various timing controller frame processor stacks, such as a decoder or panel self-refresh module. A timing controller front end can comprise modules that are specific for a particular mobile device design. For example, in some embodiments, a TCON FE comprises a power optimization module 826 that performs global dimming and local contrast enhancement that is desired to be implemented in specific laptop models, or an ALRR module where it is convenient to have the timing controller and lid controller hub components that work in synchronization (e.g., via synchronization signal 370) to be located closer together for reduced latency.

Figure 10D:
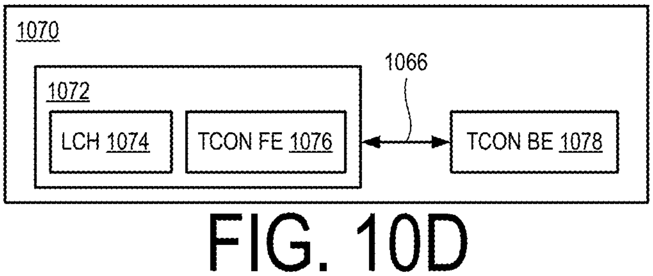
Figure 10E:
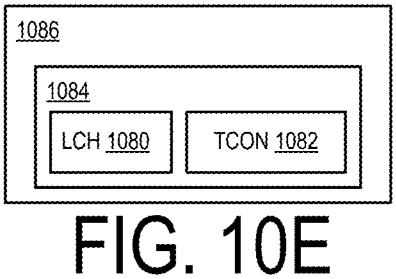

FIG. 10D illustrates an embodiment in which a second common component 1072 and a timing controller back end 1078 are located on the same module, a sixth module 1070, and the second common component 1072 and the TCON BE 1078 communicate via a connection 1066. FIG. 10E illustrates an embodiment in which a lid controller hub 1080 and a timing controller 1082 are integrated on a third common component 1084 that is located on a seventh module 1086. In some embodiments, the third common component 1084 is an integrated circuit package and the LCH 1080 and TCON 1082 are individual integrated circuit die packaged in a multi-chip package or circuits located on a single integrated circuit die. In embodiments where the lid controller hub and the timing controller are located on physically separate modules (e.g., FIG. 10A, FIG. 10C), the connection between modules can comprise a plurality of wires, a flexible printed circuit, a printed circuit, or by one or more other components that provide for communication between modules.

The modules and components in FIGS. 10C-10E that comprise a lid controller hub and a timing controller (e.g., fourth module 1058, second common component 1072, and third common component 1084) can be referred to a lid controller hub.

Figure 11:
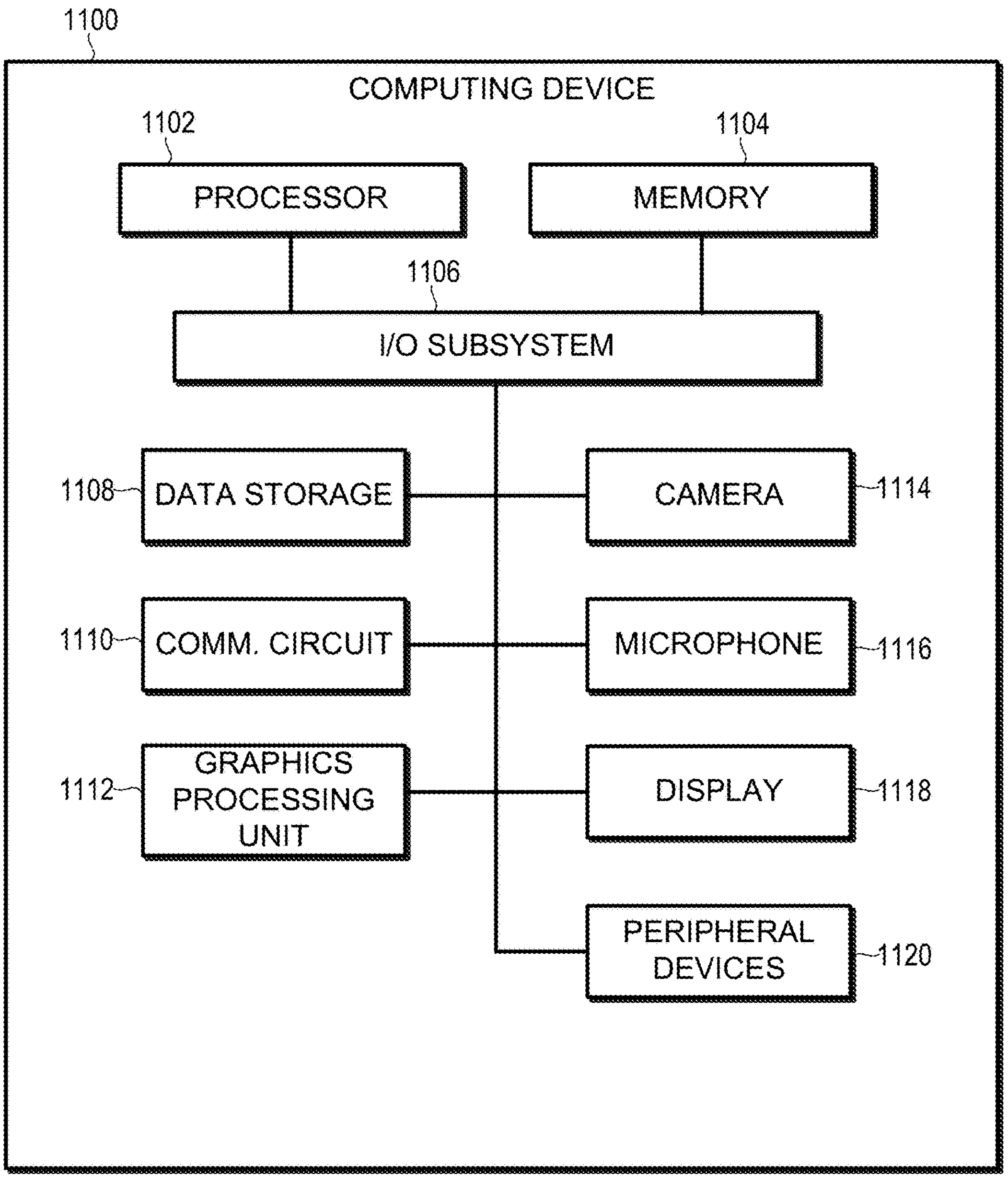
FIG. 11 is a simplified block diagram of at least one embodiment of a computing device for selective updating of a display.

Referring now to FIG. 11, in one embodiment, a computing device 1100 for selective updating of a display is shown. In use, the illustrative computing device 1100 determines zero, one, or more regions of a display to be updated. For example, a user may move a cursor and a clock may change from one frame to the next, requiring an update to two regions of a display. Messages sent to the display to update regions of a frame can be compressed. In the illustrative embodiment, the overhead required to send a compressed region can lead to a message with a greater size than the full size of the uncompressed region. As such, the computing device 1100 may send some update regions to the display in a compressed format and may send other update regions to the display in an uncompressed format. The display can receive both compressed and uncompressed update regions for the same frame.

The computing device 1100 may be embodied as any type of computing device. For example, the computing device 1100 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. In some embodiments, the computing device 1100 may be located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

The illustrative computing device 1100 includes a processor 1102, a memory 1104, an input/output (I/O) subsystem 1106, data storage 1108, a communication circuit 1110, a graphics processing unit 1112, a camera 1114, a microphone 1116, a display 1118, and one or more peripheral devices 1120. In some embodiments, one or more of the illustrative components of the computing device 1100 may be incorporated in, or otherwise form a portion of, another component. For example, the memory 1104, or portions thereof, may be incorporated in the processor 1102 in some embodiments. In some embodiments, one or more of the illustrative components may be physically separated from another component. In some embodiments, the computing device 1100 may be embodied as a computing device described above, such as computing device 100, 122, 200, 300, or 900. Accordingly, in some embodiments, the computing device 1100 may include a lid controller hub, such as LCH 155, 260, 305, or 954.

The processor 1102 may be embodied as any type of processor capable of performing the functions described herein. For example, the processor 1102 may be embodied as a single or multi-core processor(s), a single or multi-socket processor, a digital signal processor, a graphics processor, a neural network compute engine, an image processor, a microcontroller, or other processor or processing/controlling circuit. Similarly, the memory 1104 may be embodied as any type of volatile or non-volatile memory or data storage capable of performing the functions described herein. In operation, the memory 1104 may store various data and software used during operation of the computing device 1100 such as operating systems, applications, programs, libraries, and drivers. The memory 1104 is communicatively coupled to the processor 1102 via the I/O subsystem 1106, which may be embodied as circuitry and/or components to facilitate input/output operations with the processor 1102, the memory 1104, and other components of the computing device 1100. For example, the I/O subsystem 1106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 1106 may connect various internal and external components of the computing device 1100 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 1106 may form a portion of a system-on-a-chip (SoC) and be incorporated, along with the processor 1102, the memory 1104, and other components of the computing device 1100 on a single integrated circuit chip.

The data storage 1108 may be embodied as any type of device or devices configured for the short-term or long-term storage of data. For example, the data storage 1108 may include any one or more memory devices and circuits, memory cards, hard disk drives, solid-state drives, or other data storage devices.

The communication circuit 1110 may be embodied as any type of interface capable of interfacing the computing device 1100 with other computing devices, such as over one or more wired or wireless connections. In some embodiments, the communication circuit 1110 may be capable of interfacing with any appropriate cable type, such as an electrical cable or an optical cable. The communication circuit 1110 may be configured to use any one or more communication technology and associated protocols (e.g., Ethernet, Bluetooth®, Wi-Fi®, WiMAX, near field communication (NFC), etc.). The communication circuit 1110 may be located on silicon separate from the processor 1102, or the communication circuit 1110 may be included in a multi-chip package with the processor 1102, or even on the same die as the processor 1102. The communication circuit 1110 may be embodied as one or more add-in-boards, daughtercards, network interface cards, controller chips, chipsets, specialized components such as a field-programmable gate array (FPGA) or application-specific integrated circuit (ASIC), or other devices that may be used by the computing device 1102 to connect with another computing device. In some embodiments, communication circuit 1110 may be embodied as part of a system-on-a-chip (SoC) that includes one or more processors or included on a multichip package that also contains one or more processors. In some embodiments, the communication circuit 1110 may include a local processor (not shown) and/or a local memory (not shown) that are both local to the communication circuit 1110. In such embodiments, the local processor of the communication circuit 1110 may be capable of performing one or more of the functions of the processor 1102 described herein. Additionally or alternatively, in such embodiments, the local memory of the communication circuit 1110 may be integrated into one or more components of the computing device 1102 at the board level, socket level, chip level, and/or other levels.

The graphics processing unit 112 is configured to perform certain computing tasks, such as video or graphics processing. The graphics processing unit 1112 may be embodied as one or more processors, data processing unit, field-programmable gate arrays (FPGAs), application-specific integrated circuits (ASICs), and/or any combination of the above. In some embodiments, the graphics processing unit 112 may send frames or partial update regions to the display 1118.

The camera 1114 can be any of the cameras described or referenced herein, such as cameras 160, 270, 346, and 932. The camera 1114 may include one or more fixed or adjustable lenses and one or more image sensors. The image sensors may be any suitable type of image sensors, such as a CMOS or CCD image sensor. The camera 1114 may have any suitable aperture, focal length, field of view, etc. For example, the camera 1114 may have a field of view of 60-110° in the azimuthal and/or elevation directions.

The microphone 1116 is configured to sense sound waves and output an electrical signal indicative of the sound waves. In the illustrative embodiment, the computing device 1100 may have more than one microphone 1116, such as an array of microphones 1116 in different positions.

The display 1118 may be embodied as any type of display on which information may be displayed to a user of the computing device 1100, such as a touchscreen display, a liquid crystal display (LCD), a thin film transistor LCD (TFT-LCD), a light-emitting diode (LED) display, an organic light-emitting diode (OLED) display, a cathode ray tube (CRT) display, a plasma display, an image projector (e.g., 2D or 3D), a laser projector, a heads-up display, and/or other display technology. The display 1118 may have any suitable resolution, such as 7680×4320, 3840×2160, 1920×1200, 1920×1080, etc.

In some embodiments, the computing device 1100 may include other or additional components, such as those commonly found in a computing device. For example, the computing device 1100 may also have peripheral devices 1120, such as a keyboard, a mouse, a speaker, an external storage device, etc. In some embodiments, the computing device 1100 may be connected to a dock that can interface with various devices, including peripheral devices 1120. In some embodiments, the peripheral devices 1120 may include additional sensors that the computing device 1100 can use to monitor the video conference, such as a time-of-flight sensor or a millimeter-wave sensor.

Figure 12:
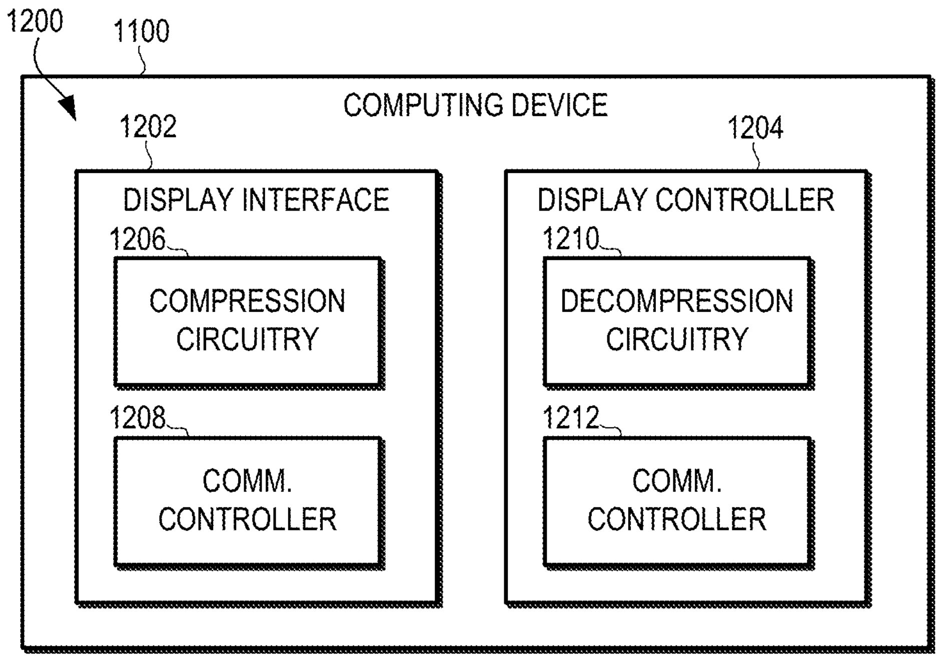
FIG. 12 is a simplified block diagram of at least one embodiment of an environment that may be established by the computing device of FIG. 11.

Referring now to FIG. 12, in an illustrative embodiment, the computing device 1100 establishes an environment 1200 during operation. The illustrative environment 1200 includes a display engine 1202 and a display controller 1204. The various modules of the environment 1200 may be embodied as hardware, software, firmware, or a combination thereof. For example, the various modules, logic, and other components of the environment 1200 may form a portion of, or otherwise be established by, the processor 1102, the graphics processing unit 1112, the memory 1104, the data storage 1108, the display 1118, or other hardware components of the computing device 1100. As such, in some embodiments, one or more of the modules of the environment 1200 may be embodied as circuitry or collection of electrical devices (e.g., display engine circuitry 1202, display controller circuitry 1204, etc.). It should be appreciated that, in such embodiments, one or more of the circuits (e.g., the display engine circuitry 1202, the display controller circuitry 1204, etc.) may form a portion of one or more of the processor 1102, the graphics processing unit 1112, the memory 1104, the I/O subsystem 1106, the data storage 1108, the display 1118, an LCH (e.g., 155, 260, 305, 954), constituent components of an LCH (e.g., audio module 170, 264, 364, 1730; vision/imaging module 172, 263, 363) and/or other components of the computing device 1100. For example, in some embodiments, some or all of the modules may be embodied as the processor 1102 and/or the graphics processor 1112 as well as the memory 1102 and/or data storage 1108 storing instructions to be executed by the processor 1102 and/or the graphics processor 1112. Additionally, in some embodiments, one or more of the illustrative modules may form a portion of another module and/or one or more of the illustrative modules may be independent of one another. Further, in some embodiments, one or more of the modules of the environment 1200 may be embodied as virtualized hardware components or emulated architecture, which may be established and maintained by the processor 1102 or other components of the computing device 1100. It should be appreciated that some of the functionality of one or more of the modules of the environment 1200 may require a hardware implementation, in which case embodiments of modules that implement such functionality will be embodied at least partially as hardware.

The display engine 1202, which may be embodied as hardware, firmware, software, virtualized hardware, emulated architecture, and/or a combination thereof as discussed above, is configured to determine frames to be sent to the display 1118 and send the images to the display 1118. In the illustrative embodiment, the display engine 1202 is part of the graphics processing unit 1112. In other embodiments, the display engine 1202 may be part of the processor 1102 or other component of the compute device 1100.

The display engine 1202 sends frames to the display 1118 by sending messages with frame data to the display 1118. In the illustrative embodiment, the display engine 1202 sends an update notification (or UPDATE_NOTI) message to the display 1118 with metadata about the data to be sent and then sends a message with the actual data. In other embodiments, the metadata and the data itself may be sent in the same message.

When the display engine 1202 is sending a completely new frame or has not yet sent an initial frame, the display engine 1202 sends an entire frame to the display 1118. The display engine 1202 may do so by breaking the frame up into slices, such as slices 1302A-1302E shown in FIG. 13.

However, in many cases, a large amount of the image shown on the display may not change from one frame to the next. For example, if the user is using a word processing application, only a small region where new characters have been typed may change, in addition to some other small changes such as a clock. In such instances, the display engine 1202 determines what differences, if any, are present between the next frame to be sent to the display 1118 and the previous frame sent to the display 1118. The display engine 1202 may determine several update regions by defining one or more update regions, such as update region 1304A and update region 1304B shown in FIG. 13. In the illustrative embodiment, the update regions 1304 may span across two or more slices 1302. The update regions 1304 may be sent to the display 1118 using compression circuitry 1206 and a communication controller 1208.

The compression circuitry 1206 is to compress the slices 1302 and update regions 1304 sent to the display 1118. In the illustrative embodiment, the compression circuitry 1206 may compress the data by a factor of 2 or 3 (or 1, in the case of no compression). However, the encoding of a small update region 1304 may, in some cases, lead to a larger data block to be sent to the display 1118 than sending the update region 1304 uncompressed. The compression circuitry 1206 determines whether to compress each update region 1304. In the illustrative embodiment, if the compressed update region 1304 (including any overhead) is larger than the uncompressed update region 1304, the compression circuitry 1206 will not compress the update region 1304. The compression circuitry 1206 may use any suitable compression algorithm, such as the Display Stream Compression (DSC) 1.1, DSC 1.2a, DSC 1.2b, VESA Display Compression-M (VDC-M) 1.1, VDC-M 1.2, etc. In the illustrative embodiment, the compression circuitry 1206 is always enabled. In other embodiments, the compression circuitry 1206 may be able to be disabled in order to provide higher quality at a cost of lower efficiency, such as when a device is plugged into an external power supply.

The communication controller 1208 is to send messages to the display 1118. In the illustrative embodiment, the communication controller 1208 sends an UPDATE_NOTI message to the display 1118 with metadata about an update message to be sent. The UPDATE_NOTI message may have the format shown in the table 1400. A DSC flag may indicate whether compression (such as DSC 1.2b) is used. The DSC flag may indicate what compression ratio is used. For example, as shown in the table 1402 in FIG. 14B, a value of 01b may indicate a 1:1 compression ratio (i.e., no compression), a value of 10b may indicate a 2:1 compression ratio, and a value of 11b may indicate a 3:1 compression ratio. The UPDATE_NOTI message may also indicate the length of the message to be sent as well as start and stop x- and y-coordinates defining the location of the update region.

After sending an UPDATE_NOTI message for an update region, the communication controller 1208 will send a message to the display 1118 with the compressed or uncompressed data for the update region. In some embodiments, the metadata indicating the location of the update region and the compression ratio may be combined with the message that carries the data itself.

In the illustrative embodiment, the communication controller 1208 communicates with the display 1118 over a Peripheral Component Interconnect express (PCIe) link. The communication controller 1208 may communicate using PCIe vendor-defined messages (VDMs). In other embodiments, the communication controller 1208 communicates with the display 1118 over another link, such as DisplayPort, embedded DisplayPort, etc. In the illustrative embodiment, the communication controller 1208 does not need to send the messages to the display 1118 at a particular time, as long as the data is sent before the display 1118 needs it to update the display 1118. In other embodiments, the communication controller 1208 may follow certain timing constraints such that the display 1118 receives information about a particular set of pixels at a particular time.

The display controller 1204, which may be embodied as hardware, firmware, software, virtualized hardware, emulated architecture, and/or a combination thereof as discussed above, is configured to receive frames and display them on the display 1118. In the illustrative embodiment, the display engine 1202 is part of the display 1118. In other embodiments, the display engine 1202 may be part of an LCH (e.g., 155, 260, 305, 954) or other component of the computing device 1100. The illustrative display controller 1204 includes decompression circuitry 1210 and a communication controller 1212.

The display controller 1204 receives messages from the display engine 1202 with image data to be displayed on the display 1118. In the illustrative embodiment, the communication controller 1212 receives UPDATE_NOTI messages with metadata about messages to be received, such as the region to be updated and whether the message with the data for the update region is compressed.

When a message with data is received, if it is compressed, the decompression circuitry 1210 decompresses it. The display controller 1204 can then update regions of the display 1118 based on the received messages.

Figure 15:
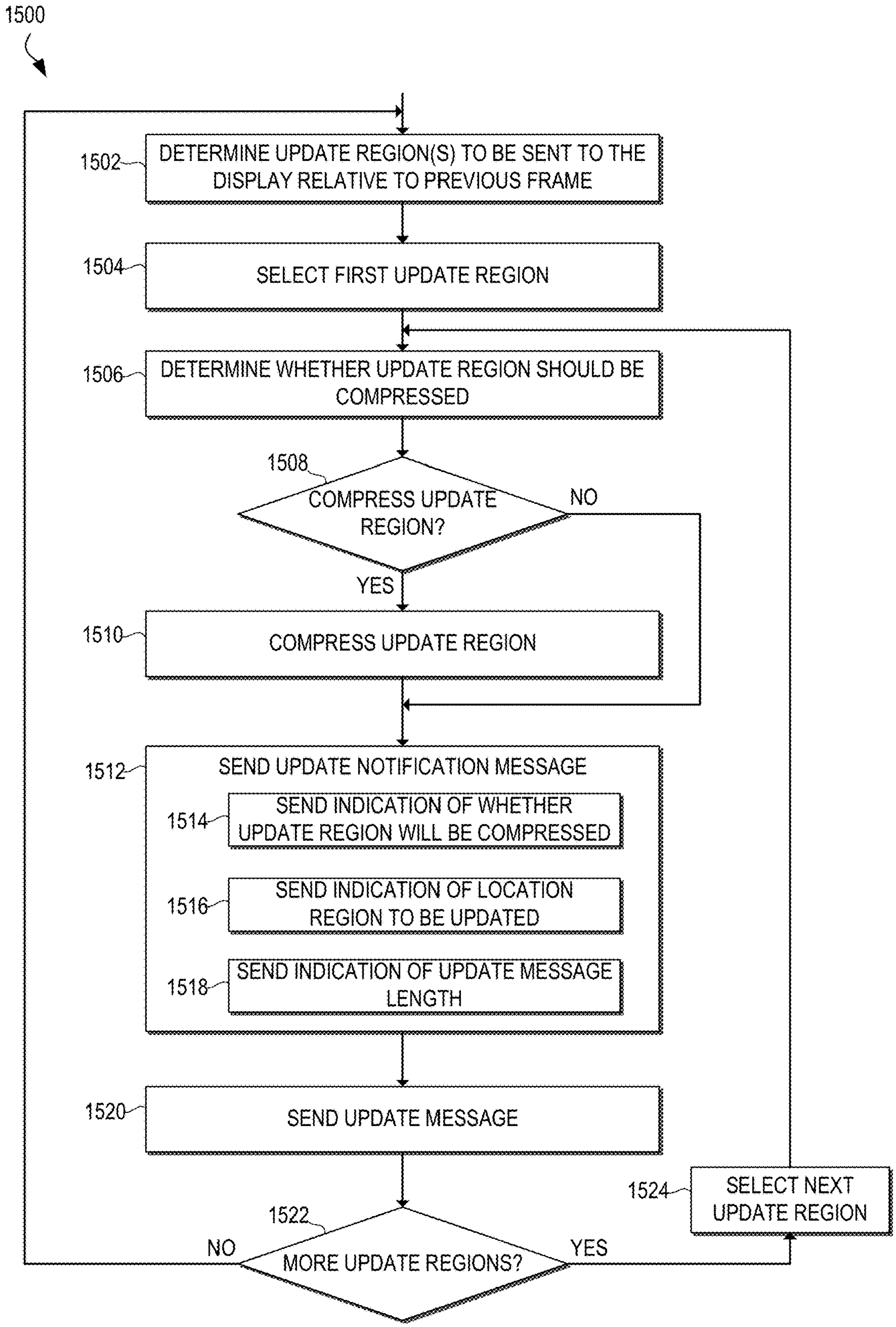
FIG. 15 is a simplified flow diagram of at least one embodiment of a method for sending compressed and uncompressed update regions to a display that may be executed by the computing device of FIG. 11.

Referring now to FIG. 15, in use, the computing device 1100 may execute a method 1500 for selective updating of a display 1118. The method 1500 begins in block 1502, in which the display engine 1202 determines one or more update regions to be sent to the display 1118 relative to the previous frame. Update regions may be identified by, e.g., a pixel-by-pixel analysis for what has changed, receiving an indication of a change from the processor 1102 or other component, or in any other suitable manner. In the illustrative embodiment, an update region is defined by a rectangular box surrounding an area with pixels that have changed values relative to the previous frame. In block 1504, the display engine 1202 selects the first update region.

In block 1506, the display engine 1202 determines whether the selected update region should be compressed. As discussed above, the encoding of a small update region may, in some cases, lead to a larger data block to be sent to the display 1118 than sending the update region 1304 uncompressed. In the illustrative embodiment, if the compressed update region (including any overhead) is larger than the uncompressed update region, the display engine 1202 will not compress the update region. The display engine 1202 may use any suitable compression algorithm, such as the Display Stream Compression (DSC) 1.1, DSC 1.2a, DSC 1.2b, VESA Display Compression-M (VDC-M) 1.1, VDC-M 1.2, etc.

In block 1508, if the display engine 1202 is to compress the update region, the method 1500 proceeds to block 1510, in which the display engine 1202 compresses the update region. If the display engine 1202 is not to compress the update region, the method 1500 jumps to block 1512.

In block 1512, the display engine 1202 sends an update notification (or UPDATE_NOTI) message. In block 1514, the display engine 1202 may include an indication of whether the update region is compressed as well as a compression ratio. In block 1516, the display engine 1202 may include an indication of the region to be updated, such as the start and stop x- and y-coordinates defining the location of the update region. In block 1518, the display engine 1202 may include an indication of the length of the update message.

The display engine 1202 communicates with the display 1118 over a Peripheral Component Interconnect express (PCIe) link. The display engine 1202 may communicate using PCIe vendor-defined messages (VDMs). In other embodiments, the display engine 1202 communicates with the display 1118 over another link, such as DisplayPort, embedded DisplayPort, etc. In the illustrative embodiment, the display engine 1202 can send the message asynchronously from any timing constraints, as long as the data is sent before the display 1118 needs it to update the display 1118. In other embodiments, the display engine 1202 may follow certain timing constraints such that the display 1118 receives information about a particular set of pixels at a particular time.

In block 1520, the display engine 1202 sends the update message that includes the data for the update region.

In block 1522, if there are more update regions for the frame, the method 1500 proceeds to block 1524, in which the next update region is selected. The method 1500 then loops back to block 1506 to determine whether the next update region should be compressed.

Referring back to block 1522, if there are no more update regions for the frame, the method 1500 loops back to block 1502 to determine update regions for the next frame.

Figure 16:
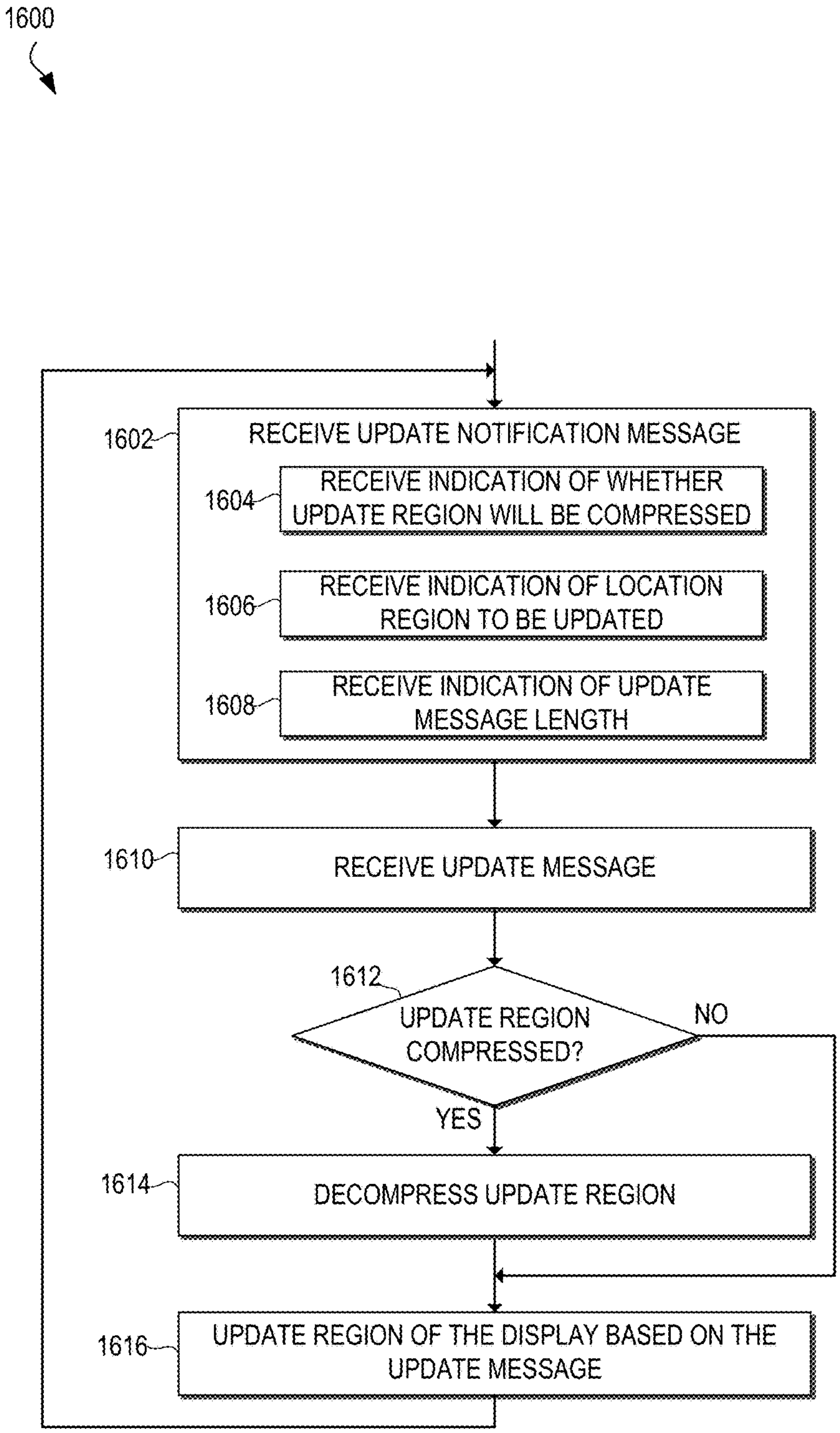
FIG. 16 is a simplified flow diagram of at least one embodiment of a method for receiving compressed and uncompressed update regions by a display that may be executed by the computing device of FIG. 11.

Referring now to FIG. 16, in use, the computing device 1100 may execute a method 1600 for receiving selective updates of a display 1118. The method 1600 begins in block 1602, in which a display 1118 receives an update notification (or UPDATE_NOTI) message from a display engine 1202. The update notification informs the display 1118 that an update message with data for an update region will be coming. The display 1118 may receive an indication of whether the update region will be compressed in block 1604. The display 1118 may receive an indication of the location of the region to be updated in block 1606. The display 1116 may receive an indication of the length of the update message in block 1608.

In block 1610, the display 1118 receives the update message, which includes the data for the update region. In block 1612, if the data for the update region is compressed, the method 1600 proceeds to block 1614, in which the display 1118 decompresses the data for the update region. If the data for the update region is not compressed, the method 1600 jumps to block 1602.

In block 1616, the display 1118 updates the region of the display based on the data received at the update message. The display 1118 may update the display 1118 as soon as the update message is received, or the display 1118 may wait for the next refresh time to update the display 1118.

It should be appreciated that different update regions for the same frame can have different compression ratios (including one being uncompressed with a compression ratio of 1:1 and one being compressed at a ratio of, e.g., 2:1 or 3:1). As such, the computing device 1100 can dynamically adjust compression on a region-by-region basis.

It should be appreciated that the approach described herein for updating particular regions may be used, in some embodiments, as the basis for sending all frames to the display 1118. In instances where most or all of the image to be shown on the display 1118 changed, the update regions may simply cover the entire display 1118. When only a small subset of the image has changed, a smaller number of update regions may be sent, reducing the required bandwidth and power.

EXAMPLES

Illustrative examples of the technologies disclosed herein are provided below. An embodiment of the technologies may include any one or more, and any combination of, the examples described below.

Example 1 includes a computing device comprising display engine circuitry to send, to a display of the computing device, an indication that one or more compressed update regions will be sent to update a previous frame; send, to the display, the one or more compressed update regions to update the previous frame; send, to the display, an indication that one or more uncompressed update regions will be sent to update the previous frame; and send, to the display, the one or more uncompressed update regions to update the previous frame.

Example 2 includes the subject matter of Example 1, and wherein the display engine circuitry is further to determine a plurality of update regions to be sent to the display; determine whether individual update regions of the plurality of update regions would be smaller when compressed; send individual update regions of the plurality of update regions that would be smaller when compressed to the display in a compressed format in response to a determination that the corresponding individual update regions of the plurality of update regions would be smaller when compressed; and send individual update regions of the plurality of update regions that would not be smaller when compressed to the display in an uncompressed format in response to a determination that the corresponding individual update regions of the plurality of update regions would not be smaller when compressed.

Example 3 includes the subject matter of any of Examples 1 and 2, and wherein to send the indication that the one or more compressed update regions will be sent to update a previous frame comprises to send an update notification message to the display, wherein the update notification message comprises an indication of a location, width, and length of an update region of the one or more compressed update regions.

Example 4 includes the subject matter of any of Examples 1-3, and wherein the update notification message comprises an indication of a compression ratio of the update region of the one or more compressed update regions.

Example 5 includes the subject matter of any of Examples 1-4, and wherein to send the one or more compressed update regions to update the previous frame comprises to send an update message comprising the update region, wherein the update message is separate from the update notification message.

Example 6 includes the subject matter of any of Examples 1-5, and wherein to send the one or more compressed update regions comprises to asynchronously send the one or more compressed update regions.

Example 7 includes the subject matter of any of Examples 1-6, and wherein to send the indication that the one or more compressed update regions will be sent comprises to send, over a peripheral component interconnect express (PCIe) link, the indication that the one or more compressed update regions will be sent.

Example 8 includes the subject matter of any of Examples 1-7, and wherein to send, over the PCIe link, the indication that the one or more compressed update regions will be sent comprises to send, over the PCIe link with a vendor defined message, the indication that the one or more compressed update regions will be sent.

Example 9 includes the subject matter of any of Examples 1-8, and wherein to send the indication that the one or more compressed update regions will be sent comprises to send, over an embedded display port link, the indication that the one or more compressed update regions will be sent.

Example 10 includes the subject matter of any of Examples 1-9, and wherein the display engine circuitry is further to receive, from the display, the one or more compressed update regions to update the previous frame; receive, from the display, the one or more uncompressed update regions to update the previous frame; and update the previous frame based on the one or more compressed update regions and the one or more uncompressed update regions.

Example 11 includes a computing device comprising display controller circuitry to receive, from display engine circuitry of the computing device, one or more compressed update regions to update a previous frame; receive, from the display engine circuitry, one or more uncompressed update regions to update the previous frame; and update the previous frame on a display based on the one or more compressed update regions and the one or more uncompressed update regions.

Example 12 includes the subject matter of Example 11, and wherein the display controller circuitry is to receive, from the display engine circuitry, an update notification message, wherein the update notification message comprises an indication that an update region of the one or more compressed update regions will be sent to update the previous frame.

Example 13 includes the subject matter of any of Examples 11 and 12, and wherein the update notification message comprises an indication of a location, width, and length of an update region of the one or more compressed update regions.

Example 14 includes the subject matter of any of Examples 11-13, and wherein the update notification message comprises an indication of a compression ratio of the update region of the one or more compressed update regions.

Example 15 includes the subject matter of any of Examples 11-14, and wherein to receive the one or more compressed update regions to update the previous frame comprises to receive an update message comprising the update region, wherein the update message is separate from the update notification message.

Example 16 includes the subject matter of any of Examples 11-15, and wherein to receive the one or more compressed update regions comprises to asynchronously receive the one or more compressed update regions.

Example 17 includes the subject matter of any of Examples 11-16, and wherein to receive the one or more compressed update regions to update the previous frame comprises to receive, over a peripheral component interconnect express (PCIe) link, the one or more compressed update regions.

Example 18 includes the subject matter of any of Examples 11-17, and wherein to receive, over the PCIe link, the one or more compressed update regions comprises to receive, over the PCIe link with a vendor defined message, the one or more compressed update regions.

Example 19 includes the subject matter of any of Examples 11-18, and wherein to receive the one or more compressed update regions comprises to receive, over an embedded display port link, the one or more compressed update regions.

Example 20 includes a method comprising sending, by display engine circuitry of a computing device and to a display of the computing device, an indication that one or more compressed update regions will be sent to update a previous frame; sending, by the display engine circuitry and to the display, the one or more compressed update regions to update the previous frame; sending, by the display engine circuitry and to the display, an indication that one or more uncompressed update regions will be sent to update the previous frame; and sending, by the display engine circuitry and to the display, the one or more uncompressed update regions to update the previous frame.

Example 21 includes the subject matter of Example 20, and further including determining, by the display engine circuitry, a plurality of update regions to be sent to the display; determining, by the display engine circuitry, whether individual update regions of the plurality of update regions would be smaller when compressed; sending, by the display engine circuitry, individual update regions of the plurality of update regions that would be smaller when compressed to the display in a compressed format in response to a determination that the corresponding individual update regions of the plurality of update regions would be smaller when compressed; and sending, by the display engine circuitry, individual update regions of the plurality of update regions that would not be smaller when compressed to the display in an uncompressed format in response to a determination that the corresponding individual update regions of the plurality of update regions would not be smaller when compressed.

Example 22 includes the subject matter of any of Examples 20 and 21, and wherein sending the indication that the one or more compressed update regions will be sent to update a previous frame comprises sending an update notification message to the display, wherein the update notification message comprises an indication of a location, width, and length of an update region of the one or more compressed update regions.

Example 23 includes the subject matter of any of Examples 20-22, and wherein the update notification message comprises an indication of a compression ratio of the update region of the one or more compressed update regions.

Example 24 includes the subject matter of any of Examples 20-23, and wherein sending the one or more compressed update regions to update the previous frame comprises sending an update message comprising the update region, wherein the update message is separate from the update notification message.

Example 25 includes the subject matter of any of Examples 20-24, and wherein sending the one or more compressed update regions comprises asynchronously sending the one or more compressed update regions.

Example 26 includes the subject matter of any of Examples 20-25, and wherein sending the indication that the one or more compressed update regions will be sent comprises sending, over a peripheral component interconnect express (PCIe) link, the indication that the one or more compressed update regions will be sent.

Example 27 includes the subject matter of any of Examples 20-26, and wherein sending, over the PCIe link, the indication that the one or more compressed update regions will be sent comprises sending, over the PCIe link with a vendor defined message, the indication that the one or more compressed update regions will be sent.

Example 28 includes the subject matter of any of Examples 20-27, and wherein sending the indication that the one or more compressed update regions will be sent comprises sending, over an embedded display port link, the indication that the one or more compressed update regions will be sent.

Example 29 includes the subject matter of any of Examples 20-28, and further including receiving, by display controller circuitry of the computing device and from the display engine circuitry, the one or more compressed update regions to update the previous frame; receiving, by the display controller circuitry and from the display engine circuitry, the one or more uncompressed update regions to update the previous frame; and updating, by the display controller circuitry, the previous frame on a display based on the one or more compressed update regions and the one or more uncompressed update regions.

Example 30 includes a method comprising receiving, by display controller circuitry of a computing device and from display engine circuitry of the computing device, one or more compressed update regions to update a previous frame; receiving, by the display controller circuitry and from the display engine circuitry, one or more uncompressed update regions to update the previous frame; and updating, by the display controller circuitry, the previous frame on a display based on the one or more compressed update regions and the one or more uncompressed update regions.

Example 31 includes the subject matter of Example 30, and further including receiving, by the display controller circuitry and from the display engine circuitry, an update notification message, wherein the update notification message comprises an indication that an update region of the one or more compressed update regions will be sent to update the previous frame.

Example 32 includes the subject matter of any of Examples 30 and 31, and wherein the update notification message comprises an indication of a location, width, and length of an update region of the one or more compressed update regions.

Example 33 includes the subject matter of any of Examples 30-32, and wherein the update notification message comprises an indication of a compression ratio of the update region of the one or more compressed update regions.

Example 34 includes the subject matter of any of Examples 30-33, and wherein receiving the one or more compressed update regions to update the previous frame comprises receiving an update message comprising the update region, wherein the update message is separate from the update notification message.

Example 35 includes the subject matter of any of Examples 30-34, and wherein receiving the one or more compressed update regions comprises asynchronously receiving the one or more compressed update regions.

Example 36 includes the subject matter of any of Examples 30-35, and wherein receiving the one or more compressed update regions to update the previous frame comprises receiving, over a peripheral component interconnect express (PCIe) link, the one or more compressed update regions.

Example 37 includes the subject matter of any of Examples 30-36, and wherein receiving, over the PCIe link, the one or more compressed update regions comprises receiving, over the PCIe link with a vendor defined message, the one or more compressed update regions.

Example 38 includes the subject matter of any of Examples 30-37, and wherein receiving the one or more compressed update regions comprises receiving, over an embedded display port link, the one or more compressed update regions.

Example 39 includes a computing device comprising means for sending, to a display of the computing device, an indication that one or more compressed update regions will be sent to update a previous frame; means for sending, to the display, the one or more compressed update regions to update the previous frame; means for sending, to the display, an indication that one or more uncompressed update regions will be sent to update the previous frame; and means for sending, to the display, the one or more uncompressed update regions to update the previous frame.

Example 40 includes the subject matter of Example 39, and further including means for determining a plurality of update regions to be sent to the display; means for determining whether individual update regions of the plurality of update regions would be smaller when compressed; means for sending individual update regions of the plurality of update regions that would be smaller when compressed to the display in a compressed format in response to a determination that the corresponding individual update regions of the plurality of update regions would be smaller when compressed; and means for sending individual update regions of the plurality of update regions that would not be smaller when compressed to the display in an uncompressed format in response to a determination that the corresponding individual update regions of the plurality of update regions would not be smaller when compressed.

Example 41 includes the subject matter of any of Examples 39 and 40, and wherein the means for sending the indication that the one or more compressed update regions will be sent to update a previous frame comprises means for sending an update notification message to the display, wherein the update notification message comprises an indication of a location, width, and length of an update region of the one or more compressed update regions.

Example 42 includes the subject matter of any of Examples 39-41, and wherein the update notification message comprises an indication of a compression ratio of the update region of the one or more compressed update regions.

Example 43 includes the subject matter of any of Examples 39-42, and wherein the means for sending the one or more compressed update regions to update the previous frame comprises means for sending an update message comprising the update region, wherein the update message is separate from the update notification message.

Example 44 includes the subject matter of any of Examples 39-43, and wherein the means for sending the one or more compressed update regions comprises means for asynchronously sending the one or more compressed update regions.

Example 45 includes the subject matter of any of Examples 39-44, and wherein the means for sending the indication that the one or more compressed update regions will be sent comprises means for sending, over a peripheral component interconnect express (PCIe) link, the indication that the one or more compressed update regions will be sent.

Example 46 includes the subject matter of any of Examples 39-45, and wherein the means for sending, over the PCIe link, the indication that the one or more compressed update regions will be sent comprises means for sending, over the PCIe link with a vendor defined message, the indication that the one or more compressed update regions will be sent.

Example 47 includes the subject matter of any of Examples 39-46, and wherein the means for sending the indication that the one or more compressed update regions will be sent comprises means for sending, over an embedded display port link, the indication that the one or more compressed update regions will be sent.

Example 48 includes the subject matter of any of Examples 39-47, and further including means for receiving, from display engine circuitry of the computing device, the one or more compressed update regions to update the previous frame; means for receiving, from the display engine circuitry, the one or more uncompressed update regions to update the previous frame; and means for updating the previous frame on a display based on the one or more compressed update regions and the one or more uncompressed update regions.

Example 49 includes a computing device comprising means for receiving, from display engine circuitry of the computing device, one or more compressed update regions to update a previous frame; means for receiving, from the display engine circuitry, one or more uncompressed update regions to update the previous frame; and means for updating the previous frame on a display based on the one or more compressed update regions and the one or more uncompressed update regions.

Example 50 includes the subject matter of Example 49, and further including means for receiving, from the display engine circuitry, an update notification message, wherein the update notification message comprises an indication that an update region of the one or more compressed update regions will be sent to update the previous frame.

Example 51 includes the subject matter of any of Examples 49 and 50, and wherein the update notification message comprises an indication of a location, width, and length of an update region of the one or more compressed update regions.

Example 52 includes the subject matter of any of Examples 49-51, and wherein the update notification message comprises an indication of a compression ratio of the update region of the one or more compressed update regions.

Example 53 includes the subject matter of any of Examples 49-52, and wherein the means for receiving the one or more compressed update regions to update the previous frame comprises means for receiving an update message comprising the update region, wherein the update message is separate from the update notification message.

Example 54 includes the subject matter of any of Examples 49-53, and wherein the means for receiving the one or more compressed update regions comprises means for asynchronously receiving the one or more compressed update regions.

Example 55 includes the subject matter of any of Examples 49-54, and wherein the means for receiving the one or more compressed update regions to update the previous frame comprises means for receiving, over a peripheral component interconnect express (PCIe) link, the one or more compressed update regions.

Example 56 includes the subject matter of any of Examples 49-55, and wherein the means for receiving, over the PCIe link, the one or more compressed update regions comprises means for receiving, over the PCIe link with a vendor defined message, the one or more compressed update regions.

Example 57 includes the subject matter of any of Examples 49-56, and wherein the means for receiving the one or more compressed update regions comprises means for receiving, over an embedded display port link, the one or more compressed update regions.

Example 58 includes one or more computer-readable media comprising a plurality of instructions stored thereon that, when executed, causes a computing device to send, to a display of the computing device, an indication that one or more compressed update regions will be sent to update a previous frame; send, to the display, the one or more compressed update regions to update the previous frame; send, to the display, an indication that one or more uncompressed update regions will be sent to update the previous frame; and send, to the display, the one or more uncompressed update regions to update the previous frame.

Example 59 includes the subject matter of Example 58, and wherein the plurality of instructions further causes the computing device to determine a plurality of update regions to be sent to the display; determine whether individual update regions of the plurality of update regions would be smaller when compressed; send individual update regions of the plurality of update regions that would be smaller when compressed to the display in a compressed format in response to a determination that the corresponding individual update regions of the plurality of update regions would be smaller when compressed; and send individual update regions of the plurality of update regions that would not be smaller when compressed to the display in an uncompressed format in response to a determination that the corresponding individual update regions of the plurality of update regions would not be smaller when compressed.

Example 60 includes the subject matter of any of Examples 58 and 59, and wherein to send the indication that the one or more compressed update regions will be sent to update a previous frame comprises to send an update notification message to the display, wherein the update notification message comprises an indication of a location, width, and length of an update region of the one or more compressed update regions.

Example 61 includes the subject matter of any of Examples 58-60, and wherein the update notification message comprises an indication of a compression ratio of the update region of the one or more compressed update regions.

Example 62 includes the subject matter of any of Examples 58-61, and wherein to send the one or more compressed update regions to update the previous frame comprises to send an update message comprising the update region, wherein the update message is separate from the update notification message.

Example 63 includes the subject matter of any of Examples 58-62, and wherein to send the one or more compressed update regions comprises to asynchronously send the one or more compressed update regions.

Example 64 includes the subject matter of any of Examples 58-63, and wherein to send the indication that the one or more compressed update regions will be sent comprises to send, over a peripheral component interconnect express (PCIe) link, the indication that the one or more compressed update regions will be sent.

Example 65 includes the subject matter of any of Examples 58-64, and wherein to send, over the PCIe link, the indication that the one or more compressed update regions will be sent comprises to send, over the PCIe link with a vendor defined message, the indication that the one or more compressed update regions will be sent.

Example 66 includes the subject matter of any of Examples 58-65, and wherein to send the indication that the one or more compressed update regions will be sent comprises to send, over an embedded display port link, the indication that the one or more compressed update regions will be sent.

Example 67 includes the subject matter of any of Examples 58-66, and wherein the plurality of instructions further causes the computing device to receive, from the display, the one or more compressed update regions to update the previous frame; receive, from the display, the one or more uncompressed update regions to update the previous frame; and update the previous frame based on the one or more compressed update regions and the one or more uncompressed update regions.

Example 68 includes one or more computer-readable media comprising a plurality of instructions stored thereon that, when executed, causes a computing device to receive, from display engine circuitry of the computing device, one or more compressed update regions to update a previous frame; receive, from the display engine circuitry, one or more uncompressed update regions to update the previous frame; and update the previous frame on a display of the computing device based on the one or more compressed update regions and the one or more uncompressed update regions.

Example 69 includes the subject matter of Example 68, and wherein the plurality of instructions further cause the computing device to receive, from the display engine circuitry, an update notification message, wherein the update notification message comprises an indication that an update region of the one or more compressed update regions will be sent to update the previous frame.

Example 70 includes the subject matter of any of Examples 68 and 69, and wherein the update notification message comprises an indication of a location, width, and length of an update region of the one or more compressed update regions.

Example 71 includes the subject matter of any of Examples 68-70, and wherein the update notification message comprises an indication of a compression ratio of the update region of the one or more compressed update regions.

Example 72 includes the subject matter of any of Examples 68-71, and wherein to receive the one or more compressed update regions to update the previous frame comprises to receive an update message comprising the update region, wherein the update message is separate from the update notification message.

Example 73 includes the subject matter of any of Examples 68-72, and wherein to receive the one or more compressed update regions comprises to asynchronously receive the one or more compressed update regions.

Example 74 includes the subject matter of any of Examples 68-73, and wherein to receive the one or more compressed update regions to update the previous frame comprises to receive, over a peripheral component interconnect express (PCIe) link, the one or more compressed update regions.

Example 75 includes the subject matter of any of Examples 68-74, and wherein to receive, over the PCIe link, the one or more compressed update regions comprises to receive, over the PCIe link with a vendor defined message, the one or more compressed update regions.

Example 76 includes the subject matter of any of Examples 68-75, and wherein to receive the one or more compressed update regions comprises to receive, over an embedded display port link, the one or more compressed update regions.

The invention claimed is:

1. A computing device comprising:

display engine circuitry to:

send, to a display of the computing device, an indication that one or more compressed update regions will be sent to update a previous frame;

send, to the display, the one or more compressed update regions to update the previous frame;

send, to the display, an indication that one or more uncompressed update regions will be sent to update the previous frame; and send, to the display, the one or more uncompressed update regions to update the previous frame.

2. The computing device of claim 1, wherein the display engine circuitry is further to:

determine a plurality of update regions to be sent to the display;

determine whether individual update regions of the plurality of update regions would be smaller when compressed;

send individual update regions of the plurality of update regions that would be smaller when compressed to the display in a compressed format in response to a determination that the corresponding individual update regions of the plurality of update regions would be smaller when compressed; and send individual update regions of the plurality of update regions that would not be smaller when compressed to the display in an uncompressed format in response to a determination that the corresponding individual update regions of the plurality of update regions would not be smaller when compressed.

3. The computing device of claim 1, wherein to send the indication that the one or more compressed update regions will be sent to update a previous frame comprises to send an update notification message to the display, wherein the update notification message comprises an indication of a location, width, and length of an update region of the one or more compressed update regions.

4. The computing device of claim 3, wherein the update notification message comprises an indication of a compression ratio of the update region of the one or more compressed update regions.

5. The computing device of claim 3, wherein to send the one or more compressed update regions to update the previous frame comprises to send an update message comprising the update region, wherein the update message is separate from the update notification message.

6. The computing device of claim 1, wherein to send the one or more compressed update regions comprises to asynchronously send the one or more compressed update regions.

7. The computing device of claim 1, wherein to send the indication that the one or more compressed update regions will be sent comprises to send, over a peripheral component interconnect express (PCIe) link, the indication that the one or more compressed update regions will be sent.

8. The computing device of claim 1, wherein to send the indication that the one or more compressed update regions will be sent comprises to send, over an embedded display port link, the indication that the one or more compressed update regions will be sent.

9. The computing device of claim 1, wherein the display engine circuitry is further to:

receive, from the display, the one or more compressed update regions to update the previous frame;

receive, from the display, the one or more uncompressed update regions to update the previous frame; and update the previous frame based on the one or more compressed update regions and the one or more uncompressed update regions.

10. A computing device comprising:

display controller circuitry to:

receive, from display engine circuitry of the computing device, one or more compressed update regions to update a previous frame;

receive, from the display engine circuitry, one or more uncompressed update regions to update the previous frame; and update the previous frame on a display based on the one or more compressed update regions and the one or more uncompressed update regions.

11. The computing device of claim 10, wherein the display controller circuitry is to:

receive, from the display engine circuitry, an update notification message, wherein the update notification message comprises an indication that an update region of the one or more compressed update regions will be sent to update the previous frame.

12. The computing device of claim 11, wherein the update notification message comprises an indication of a location, width, and length of an update region of the one or more compressed update regions.

13. The computing device of claim 11, wherein the update notification message comprises an indication of a compression ratio of the update region of the one or more compressed update regions.

14. The computing device of claim 11, wherein to receive the one or more compressed update regions to update the previous frame comprises to receive an update message comprising the update region, wherein the update message is separate from the update notification message.

15. The computing device of claim 10, wherein to receive the one or more compressed update regions comprises to asynchronously receive the one or more compressed update regions.

16. The computing device of claim 10, wherein to receive the one or more compressed update regions to update the previous frame comprises to receive, over a peripheral component interconnect express (PCIe) link, the one or more compressed update regions.

17. The computing device of claim 10, wherein to receive the one or more compressed update regions comprises to receive, over an embedded display port link, the one or more compressed update regions.

18. A method comprising:

sending, by display engine circuitry of a computing device and to a display of the computing device, an indication that one or more compressed update regions will be sent to update a previous frame with a new frame;

sending, by the display engine circuitry and to the display, an indication that one or more uncompressed update regions will be sent to update the previous frame with the new frame; and sending, by the display engine circuitry and to the display, the one or more uncompressed update regions and the one or more compressed update regions to update the previous frame with the new frame.

19. The method of claim 18, the method further comprising:

determining, by the display engine circuitry, a plurality of update regions to be sent to the display;

determining, by the display engine circuitry, whether individual update regions of the plurality of update regions would be smaller when compressed;

sending, by the display engine circuitry, individual update regions of the plurality of update regions that would be smaller when compressed to the display in a compressed format in response to a determination that the corresponding individual update regions of the plurality of update regions would be smaller when compressed; and sending, by the display engine circuitry, individual update regions of the plurality of update regions that would not be smaller when compressed to the display in an uncompressed format in response to a determination that the corresponding individual update regions of the plurality of update regions would not be smaller when compressed.

20. The method of claim 18, wherein sending the indication that the one or more compressed update regions will be sent to update a previous frame comprises sending an update notification message to the display, wherein the update notification message comprises an indication of a location, width, and length of an update region of the one or more compressed update regions.

21. The method of claim 20, wherein the update notification message comprises an indication of a compression ratio of the update region of the one or more compressed update regions.

22. The method of claim 20, wherein sending the one or more compressed update regions to update the previous frame comprises sending an update message comprising the update region, wherein the update message is separate from the update notification message.

23. The method of claim 18, wherein sending the one or more compressed update regions comprises asynchronously sending the one or more compressed update regions.

24. The method of claim 18, wherein sending the indication that the one or more compressed update regions will be sent comprises sending, over a peripheral component interconnect express (PCIe) link, the indication that the one or more compressed update regions will be sent.

25. The method of claim 18, further comprising:

receiving, by display controller circuitry of the computing device and from the display engine circuitry, the one or more compressed update regions to update the previous frame;

receiving, by the display controller circuitry and from the display engine circuitry, the one or more uncompressed update regions to update the previous frame; and updating, by the display controller circuitry, the previous frame on a display based on the one or more compressed update regions and the one or more uncompressed update regions.

* * * * *